US008280953B2

(12) United States Patent
Matoba

(10) Patent No.: US 8,280,953 B2
(45) Date of Patent: Oct. 2, 2012

(54) RELAY UNIT

(75) Inventor: Kazumine Matoba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 12/725,096

(22) Filed: Mar. 16, 2010

(65) Prior Publication Data

US 2010/0241696 A1 Sep. 23, 2010

(30) Foreign Application Priority Data

Mar. 17, 2009 (JP) .................................. 2009-63875

(51) Int. Cl.
*G06F 15/16* (2006.01)

(52) U.S. Cl. ........ 709/203; 709/205; 709/223; 709/227; 709/228; 370/400; 370/241; 370/389; 370/248

(58) Field of Classification Search .................... 709/203
See application file for complete search history.

(56) References Cited

U.S. PATENT DOCUMENTS

| | | | |
|---|---|---|---|
| 6,598,081 B1 * | 7/2003 | Coile et al. .................... | 709/227 |
| 6,687,245 B2 * | 2/2004 | Fangman et al. ............. | 370/356 |
| 2002/0143956 A1 * | 10/2002 | Tanimoto ...................... | 709/227 |
| 2005/0111450 A1 * | 5/2005 | Miyamoto et al. ............ | 370/389 |
| 2007/0118663 A1 * | 5/2007 | Nguyen ......................... | 709/228 |
| 2007/0136413 A1 * | 6/2007 | Ishikawa et al. .............. | 709/200 |
| 2008/0013534 A1 * | 1/2008 | Tsuzuki et al. ................ | 370/389 |
| 2009/0161680 A1 * | 6/2009 | Ishikawa et al. .............. | 370/400 |

FOREIGN PATENT DOCUMENTS

JP 2007-157085 A 6/2007

* cited by examiner

*Primary Examiner* — Firmin Backer
*Assistant Examiner* — Natisha Cox
(74) *Attorney, Agent, or Firm* — Fujitsu Patent Center

(57) ABSTRACT

A relay unit includes: a storing unit storing a first correspondence relation between interface information of a client and a tenant identifier of the client, and a second correspondence relation among the tenant identifier, connection information about a connection with a server, and a state of connection with the server; a tenant identifying unit obtaining the tenant identifier from the first correspondence relation; a connection identifying unit creating the first connection information and adding the correspondence relation among the created first connection information, the obtained tenant identifier, and the state to a busy state into the second correspondence relation; and a connection creating unit creating a connection with the server and transmitting the obtained tenant identifier and the message to the server, wherein the connection identifying unit sets the state to an unused state in response to a reply message from the server.

9 Claims, 24 Drawing Sheets

FIG. 9A

| GW IP | GW Port | Server IP | Server Port | TENANT ID | USE FLAG |
|---|---|---|---|---|---|
| 10.0.0.1 | 15438 | 10.0.0.2 | 80 | A | 1 |
| 10.0.0.1 | 24681 | 10.0.0.2 | 80 | A | 1 |
| 10.0.0.1 | 24682 | 10.0.0.2 | 80 | A | 0 |

FIG. 9B

| GW IP | TENANT ID |
|---|---|
| 20.0.0.1 | A |
| 30.0.0.1 | B |

FIG. 9C

| TENANT ID | TENANT NETWORK CONNECTION | | | | SHARED NETWORK CONNECTION | | | |
|---|---|---|---|---|---|---|---|---|
| | Client IP | Client Port | GW IP | GW Port | GW IP | GW Port | Server IP | Server Port |
| A | 20.0.10.1 | 84667 | 20.0.0.1 | 80 | 10.0.0.1 | 15438 | 10.0.0.2 | 80 |

FIG. 20

| TENANT ID | UPPER LIMIT |
|---|---|
| B | 100 |
| C | 100 |

RELAY UNIT

CROSS-REFERENCE TO RELATED APPLICATION

This application is based upon and claims the benefit of priority from the prior Japanese Patent Application No. 2009-63875 filed on Mar. 17, 2009, the entire contents of which are incorporated herein by reference.

BACKGROUND

1. Field

The embodiments discussed herein are related to a relay unit which accommodates a plurality of different tenants, for relaying data to a shared server which executes a shared application.

2. Description of Related Art

In a server application which provides an application to a network (hereinafter, referred to as "tenant") formed for each unit of several organizations and companies, such as SaaS (Software as a Service), there is a demand of effectively using server resources by sharing an application provided to each tenant and sharing the server resources. The SaaS compatible applications are put in a shared network (for example, a server on the Internet) accessible by a plurality of tenants.

Here, the structure of the conventional system having a shared server including a multi-tenant compatible shared application, clients within each tenant, and a gateway (hereinafter, referred to as "GW") for relaying data between the tenants and the shared server is illustrated in FIG. 1. The GW is a device such as a multi-tenant compatible VPN which can accommodate a plurality of different independent networks, and satisfies a requirement that the respective tenants should be logically treated as individual networks so as not to communicate with each other directly.

The clients within the respective tenants make communication without being conscious of the tenants they belong to. Namely, when each client within a tenant transmits and receives a request message to and from the shared server, the client does not attach the information for identifying the client's own tenant (hereinafter, referred to as a "tenant ID"). Here, the unit of data exchanged between applications and the data formed of a plurality of packets is referred to as a "message."

On the other hand, the conventional multi-tenant compatible GW recognizes the respective tenants depending on where the data is transmitted from, according to the IP address possessed by the GW (in the example of FIG. 1, IP address for gaining access to a segment of the tenant A or IP address for gaining access to a segment of the tenant B) and VLAN, attaches the respective tenant IDs to the respective request messages, and then transmits the data to the shared server, in order to separately treat the communications of the respective tenants.

Upon receipt of a request message from the target processing and the tenant ID, the conventional shared server recognizes the specified tenant ID and finds out which tenant the processing is destined for, so that the shared application can be executed there.

As a method of relating a message to a tenant ID, the following two conventional methods can be considered.

The first conventional method is a method of embedding a tenant ID into a message. FIG. 2 illustrates the first conventional method. In this case, when the GW receives a message from each of the tenants, it embeds the tenant ID into the message and propagates it to the shared server. The shared server reads the tenant ID embedded in the message, to check the tenant. In the opposite direction, tenant information is transmitted from the shared server to the GW, by similarly embedding the tenant ID into the message.

The second conventional method is a method of embedding a tenant ID into a packet. FIG. 3 illustrates the second conventional embodiment. Similarly to the first conventional method of embedding it into a message, the GW embeds a tenant ID into a packet coming from the tenant and propagates it to a server.

FIG. 4 illustrates a functional block common in the first and second conventional methods. Both the GW and the shared server each have the structure including a tenant ID embedding unit which embeds a tenant ID recognized by a tenant recognizing unit into a message or a packet and reads out the above tenant ID.

As the conventional technique of communication with a tenant ID embedded, for example, a technique about a communication using SIP is disclosed.

The above-mentioned method of always embedding the tenant IDs in all the messages or all the packets increases the loads due to the embedding and reading processing, and hence degrades the performance in the GW and the shared server. Further, the above second conventional method makes it difficult to transmit the information on a tenant to an application on the side of a server because the packet header is deleted when passing through the TCP/IP layer within the server.

SUMMARY

According to an embodiment, a relay unit includes: a storing unit storing a first correspondence relation between interface information of a client and a tenant identifier of the client, and storing a second correspondence relation among the tenant identifier, connection information about a connection with a server, and a connection state with the server; a tenant identifying unit obtaining the tenant identifier from the first correspondence relation in response to a message from a client; a connection identifying unit creating the first connection information and adding the correspondence relation among the created first connection information, the obtained tenant identifier, and the connection state to a busy state into the second correspondence relation; and a connection creating unit creating a connection with the server and transmitting the obtained tenant identifier and the message to the server, wherein the connection identifying unit sets the connection state to an unused state in response to a reply message from the server.

It is to be understood that both the foregoing summary description and the following detailed description are explanatory as to some embodiments of the present invention, and not restrictive of the present invention as claimed.

BRIEF DESCRIPTION OF THE DRAWINGS

FIGS. 9A, 9B and 9C illustrate one example of the data structure for use in the first embodiment;

FIG. 20 illustrates the structure of a connection upper limit table according to the third embodiment;

DESCRIPTION OF EXAMPLE EMBODIMENTS

Figure 1:
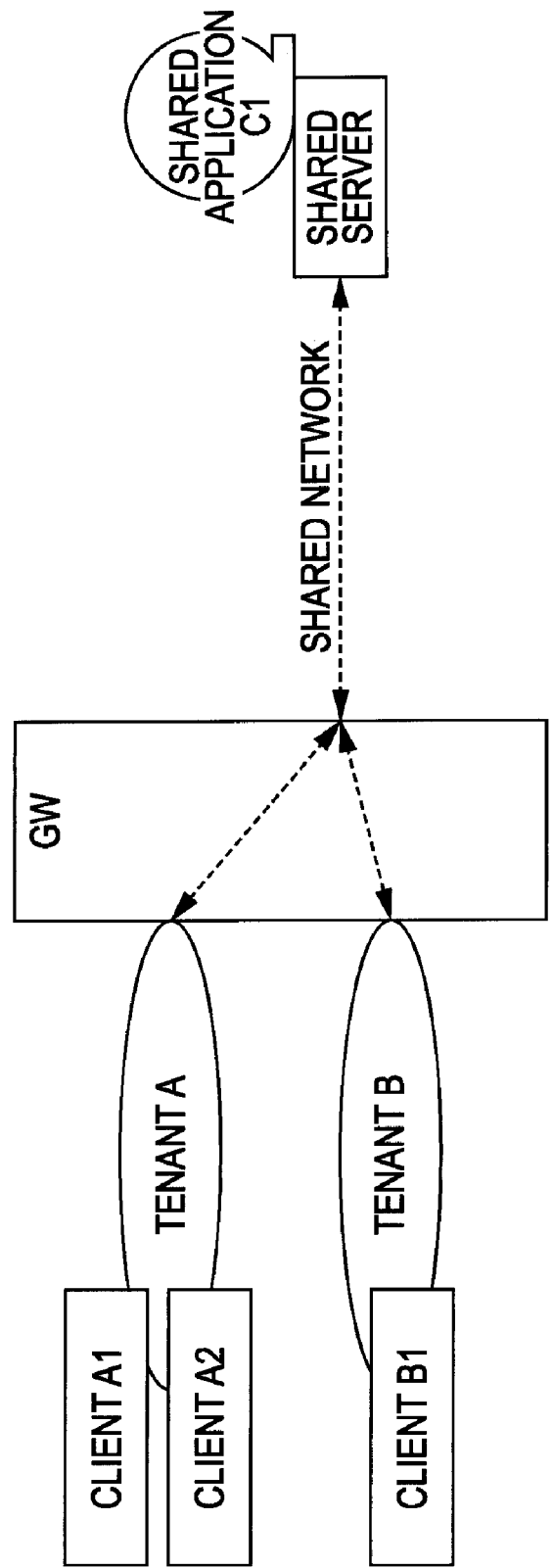
FIG. 1 illustrates a system having a shared server, clients in each tenant, and a GW for relaying data between the respective tenants and the shared server.
Figure 2:
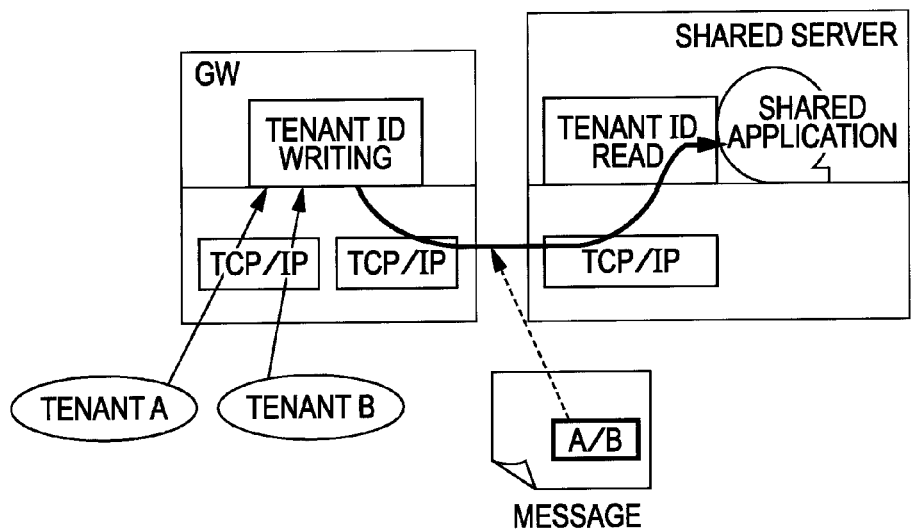
FIG. 2 illustrates the first conventional method.
Figure 3:
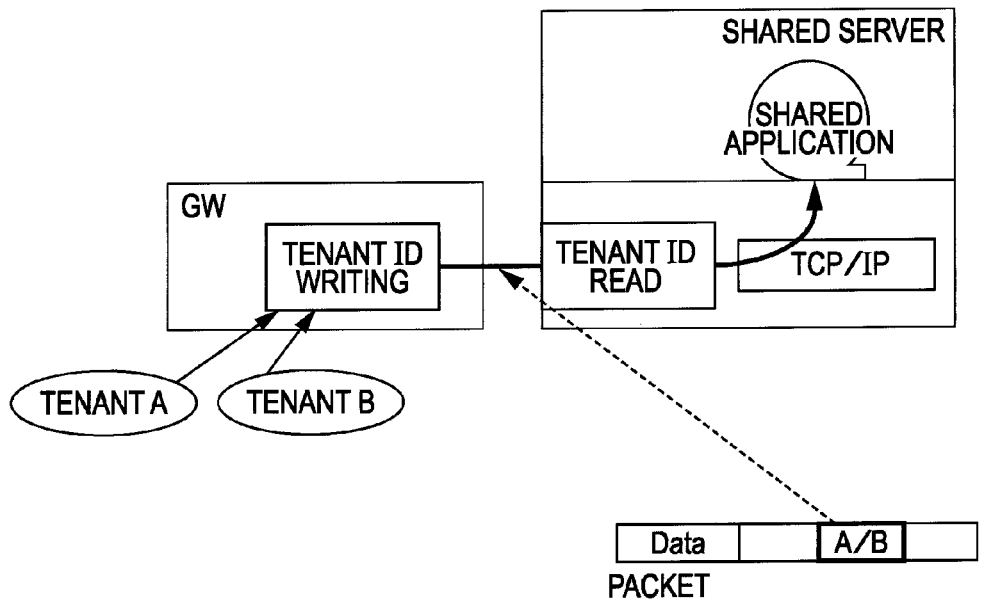
FIG. 3 illustrates the second conventional method.
Figure 4:
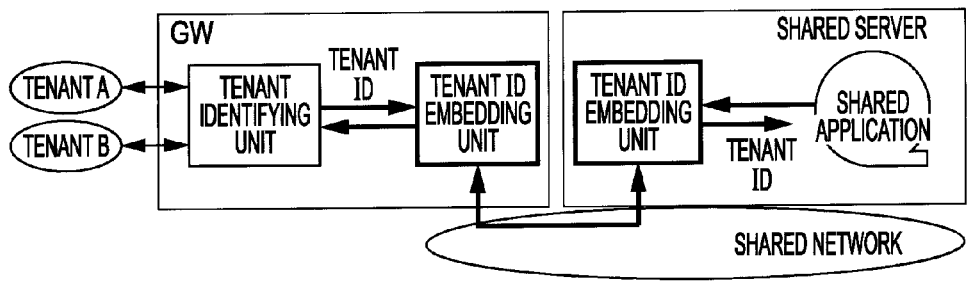
FIG. 4 is a functional block diagram common in the first and second conventional methods.

According to the embodiments, an L4 connection used between a shared server and a GW is related to a tenant ID (tenant identifier) and the tenant ID is replaced with the identification information of the L4 connection for use in the usual communication processing, hence to avoid embedding a tenant ID in every message. Here, the identification information of the L4 connection indicates a set of a source IP address, a destination IP address, a source Port number, and a destination Port number, hereinafter, referred to as a connection ID. In order to realize the above, both the GW and the shared server of the embodiment are provided with a function of relating a connection ID for use between the shared server and the GW when starting communication to a tenant ID and a function of converting the tenant ID into the connection ID when communicating. In the following description, the L4 connection is simply referred to as a connection.

When statically setting of relating the connection and tenant IDs, depletion of the connections may occur even when there is a large number of connections. When there is a plurality of shared servers or shared applications, only the connections within an upper limit previously assigned to every shared application (for example, on the whole GW, 65535÷the number of applications) may be simultaneously used. When accesses are concentrated on a specified application, the connections may become depleted. Therefore, a dynamic method of assigning as many connections as desired for communication as requested and deleting the connections is desired.

Further, performance degradation and connection depletion may occur even with dynamic settings. It is possible for the side creating a connection (GW) to judge which connection includes which tenant ID; the shared server, however, is not able to judge the above relation and therefore, has to be informed of the relation. Insertion of a tenant ID in every message causes performance degradation similar to the conventional technique. When tenant related data is deleted with a timer, if there are frequent accesses at intervals shorter than a time-out, the connections will be depleted even when there are a large number of the connections available.

In order to address these problems, the preferred embodiments provide a dynamic relating scheme with a smaller throughput than the conventional technique and a connection assignment scheme for a proper use of connections.

The dynamic relating scheme and the connection assignment scheme according to the embodiments will be described.

The dynamic relating scheme may reduce the load for the tenant ID propagation by making use of created connections. When a connection is diverted, if a client in a specified tenant transmits data while a client in another tenant is using the connection, the individuality of the transmission data becomes vague and it may be difficult to identify which client sends which transmission data, so the currently-used connection is desirably not used. Therefore, a "use flag" is provided in a tenant/connection relation table for relating the tenant IDs to the connection IDs, so that the data does not flow from a plurality of clients at the same time during one connection. Specifically, a connection state between the GW and the server is divided into the following three states (refer to FIG. 5).

Figure 5A:
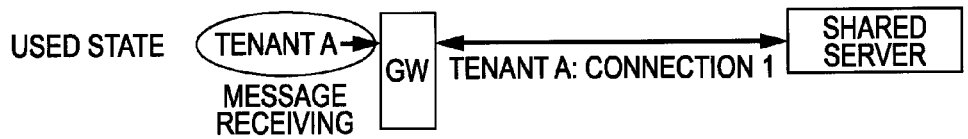
FIGS. 5A, 5B and 5C illustrate an example of types of connection states.

Busy state: where a connection has been created and a client in a specified tenant is in communication (refer to FIG. 5A).

Figure 5B:
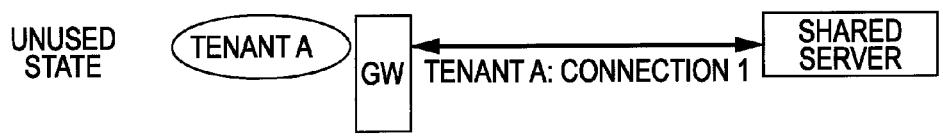

Unused state: where a connection has been created but the corresponding connection is not currently being used and is in a waiting state for another communication (refer to FIG. 5B).

Figure 5C:
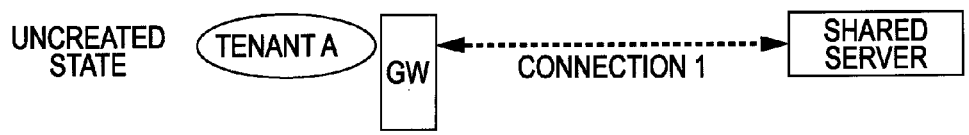

Uncreated state: where a connection is not created (refer to FIG. 5C). When the GW receives a new connection from a client, an unused or uncreated connection is used.

The connection assignment scheme according to the embodiments reduces the number of wastefully secured connections like a connection waiting for release, by selecting an unused connection and re-assigning the connection to a tenant. Specifically, in a communication with a tenant, when here is a shortage of the unused and uncreated connections, a scheme for assigning an unused connection for another tenant, to a tenant, is added.

Hereinafter, embodiments taking the above into consideration will be described.

(First Embodiment)

Figure 6:
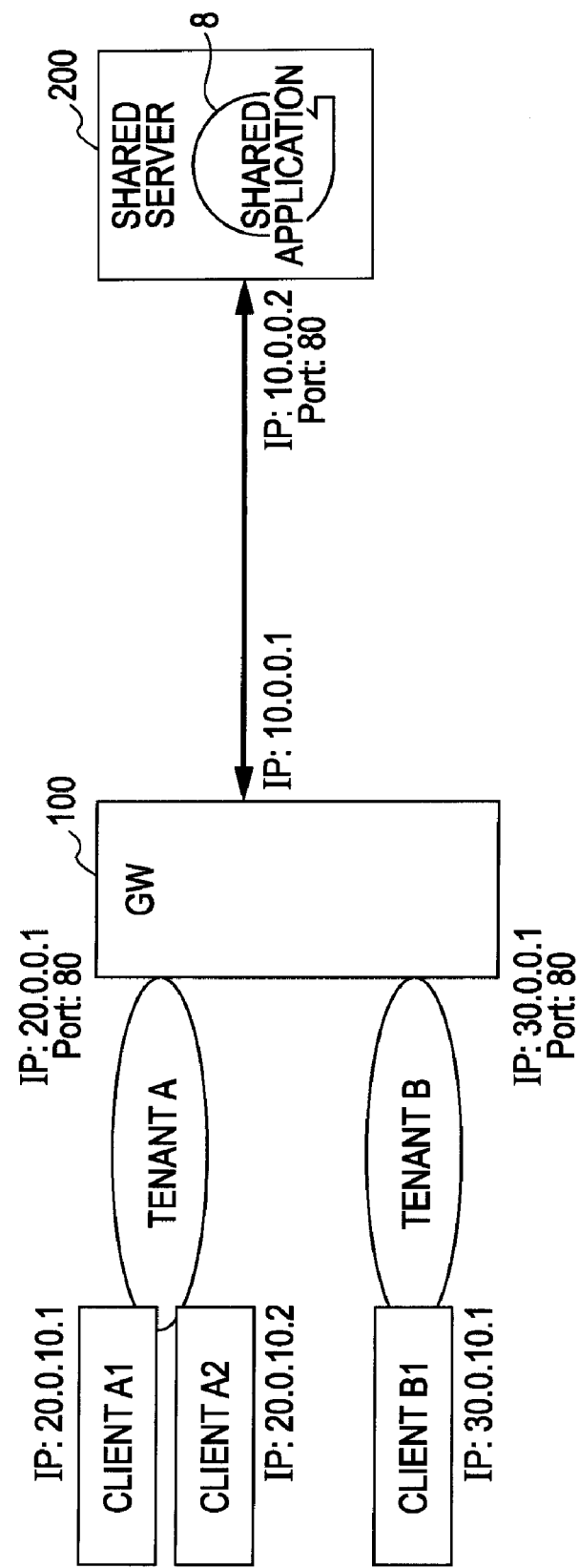
FIG. 6 is a view illustrating one example of a system structure.

A system structure and an example of relations of IP addresses and connection port numbers in respective units are illustrated in FIG. 6. This system has a client A1 and a client A2 belonging to a tenant A and a client B1 belonging to a tenant B. The system includes a GW 100 which is connected to the tenant A and the tenant B and a shared server 200 having a shared application 8. The GW 100 is able to judge a source tenant of a message from the interface of a network (for example, VLAN and physical port) and an IP address.

The IP address of the client A1 is 20.0.10.1 and the IP address of the client A2 is 20.0.10.2. The IP address of the client B1 is 30.0.10.1. The GW 100 is connected to the tenant A with the IP address of 20.0.0.1 and to the tenant B with the IP address of 30.0.0.1. The respective clients in the tenants A and B are connected to a port number 80 in the GW 100.

The GW 100 is connected to the shared server 200 with the IP address 10.0.0.1 on the shared network, and the shared server 200 is connected to the GW 100 with the IP address 10.0.0.2 on the shared network. The GW 100 is connected to the Port number 80 of the shared server 200.

Figure 7:
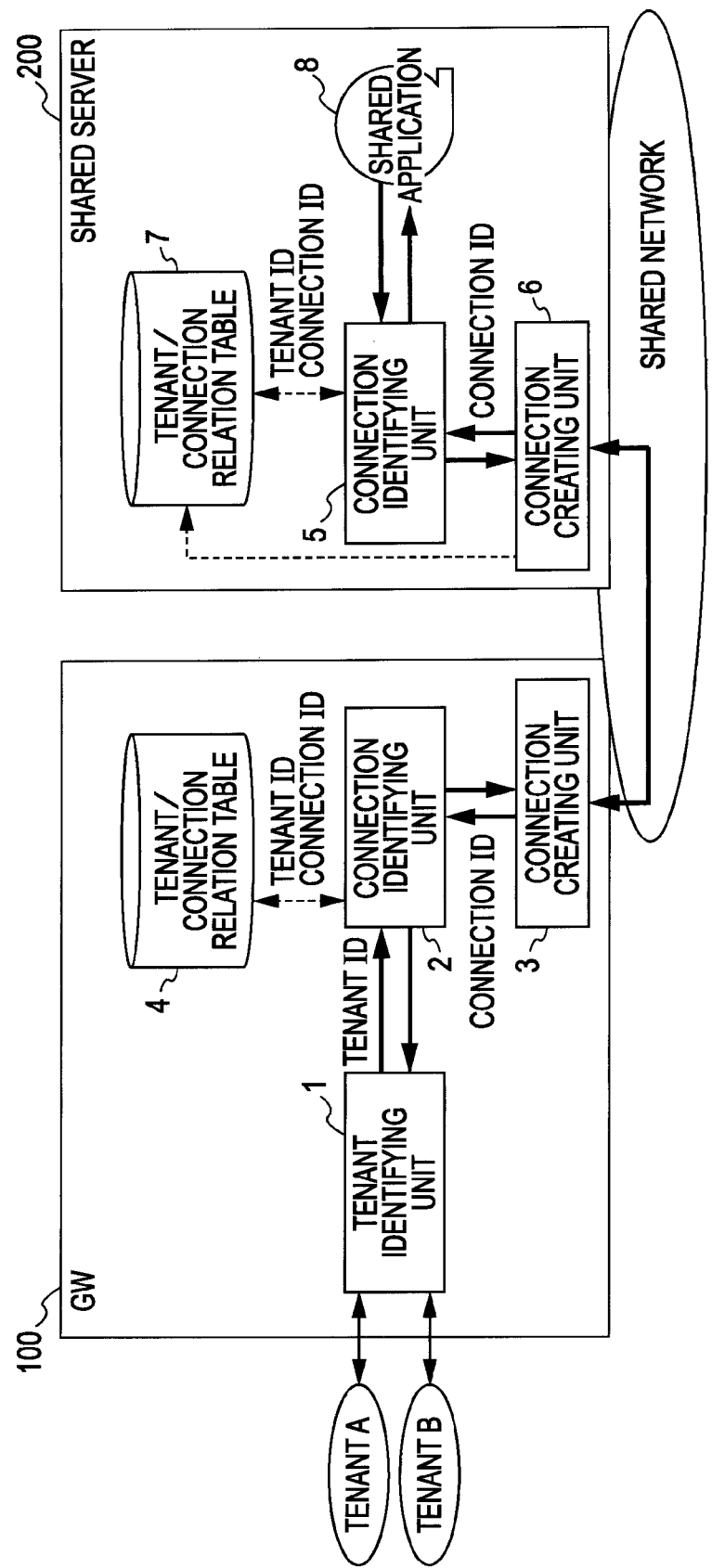
FIG. 7 is a functional block diagram of a first embodiment.

FIG. 7 illustrates functional blocks in the GW 100 and the shared server 200 according to the first embodiment. The GW 100 includes a tenant identifying unit 1, a connection identifying unit 2, a connection creating unit 3, and a tenant/connection relation table 4.

The tenant identifying unit 1 converts a tenant ID to which a client belongs and a connection ID, and receives a request message from a client in each tenant, identifies the tenant of the transmission source, and decides the tenant ID. The tenant identifying unit 1 transmits a response message from the shared server 200 to the tenant corresponding to the tenant ID received from the connection identifying unit 2.

The connection identifying unit 2 decides the connection ID of a connection for use between the shared server 200 and manages the correspondences between tenant IDs and connections on the shared network. When receiving a request, the connection identifying unit 2 searches the tenant/connection relation table 4 for the tenant ID to obtain the corresponding connection ID. When there is no corresponding connection, the connection identifying unit 2 decides the connection ID to be secured, adds the entry to the tenant/connection relation table 4, and updates the tenant/connection relation table 4. When receiving a response, the connection identifying unit 2 searches the tenant/connection relation table 4 for the connection ID to obtain the corresponding tenant ID.

The connection creating unit 3 creates the connection ID decided by the connection identifying unit 2 to share the connection related to the tenant ID with the shared server 200. The connection creating unit 3 creates a connection when the connection of the connection ID decided by the connection identifying unit 2 is not created when receiving a request and informs the shared server 200 of the relation between the tenant ID and the connection ID. The connection creating unit 3 transmits the request message to the shared server, making use of the created connection. The connection creating unit 3 passes the received response and connection ID to the connection identifying unit 2 when receiving the response.

The tenant/connection relation table 4 is a table for keeping the relations between the connection IDs and the tenant IDs.

The shared server 200 includes a connection identifying unit 5, a connection creating unit 6, a tenant/connection relation table 7, and the shared application 8.

The connection identifying unit 5 converts the connection ID into the tenant ID. When receiving the request message, the connection identifying unit 5 searches the tenant/connection relation table for the connection ID to obtain the corresponding tenant ID. When transmitting the response message, the connection identifying unit 5 searches the tenant/connection relation table 7 for the tenant ID to obtain the corresponding connection ID.

The connection creating unit 6 creates a connection to share the connection related tenant ID with the GW 100. The connection creating unit 6 creates a connection with the GW 100 before receiving the request message. When the connection creating unit 6 is informed of the connection related tenant ID from the GW 100, the connection creating unit 6 registers the information into the tenant/connection relation table 7. The connection creating unit 6 transmits a response message to the GW 100 by making use of the connection of the connection ID specified by the connection identifying unit 5 when transmitting the response message.

The tenant/connection relation table 7 is a table for keeping the relations between the connection IDs and the tenant IDs.

The shared application 8 is an application which performs processing for each tenant. When receiving a request, the shared application 8 performs the processing for a specified tenant ID, and when transmitting a response, the shared application 8 passes the processing result to the connection identifying unit 5 together with the tenant ID specified at the receiving time.

Next, the processing of the respective clients in a tenant, the GW 100, and the shared server 200 will be described. The description will be made hereinafter with a procedure 1 representing sending a message from the client A1 in the tenant A to the shared server 200 and a procedure 2 representing returning a response from the shared server 200 to the client A1. Further, description will be made, after completion of the procedure 2, about a procedure 3 representing sending a message from the other client A2 in the tenant A to the shared server 200 and after the completion of the sequence of all the clients in the tenant A, about the procedure 4 representing sending a message from the client B1 in the tenant B to the shared server 200. Here, since the responses in the procedures 3 and 4 are the same as that of the procedure 2, their description is omitted.

Figure 8:
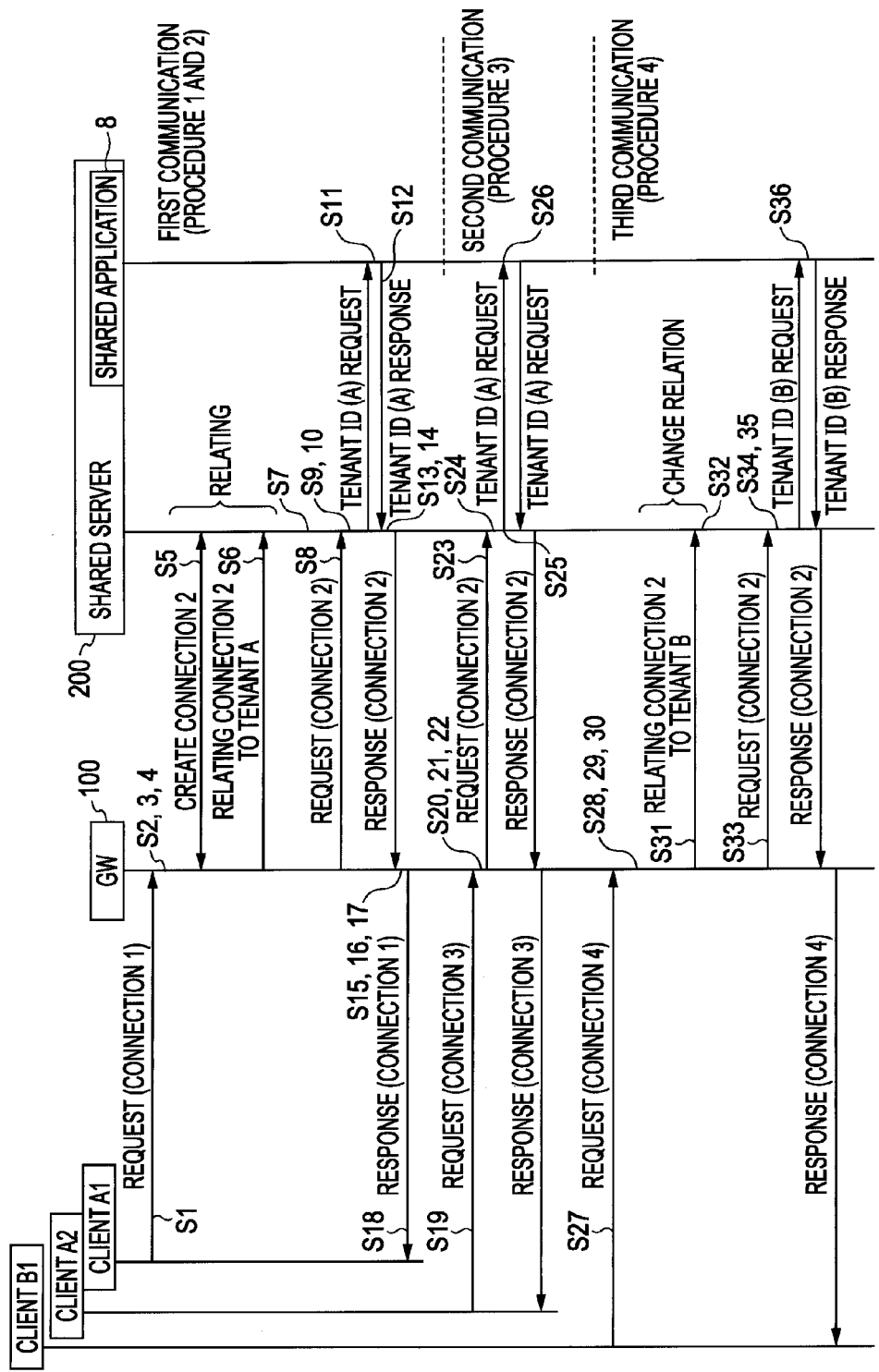
FIG. 8 illustrates a sequence among the clients, the GW, and the shared server, according to the first embodiment.

FIG. 8 illustrates a sequence occurring among the respective clients, the GW 100, and the shared server 200. FIG. 9 illustrates the data structure for use in the first embodiment. FIG. 9A is an example of the table components of the tenant/connection relation tables 4 and 7, and FIG. 9B is an example of the table components for identifying tenants kept in the GW 100. FIG. 9C is an example of the table components relation table illustrating a correspondence of the connection ID in the tenant, the connection ID in the shared network, and the tenant ID.

Figure 10:
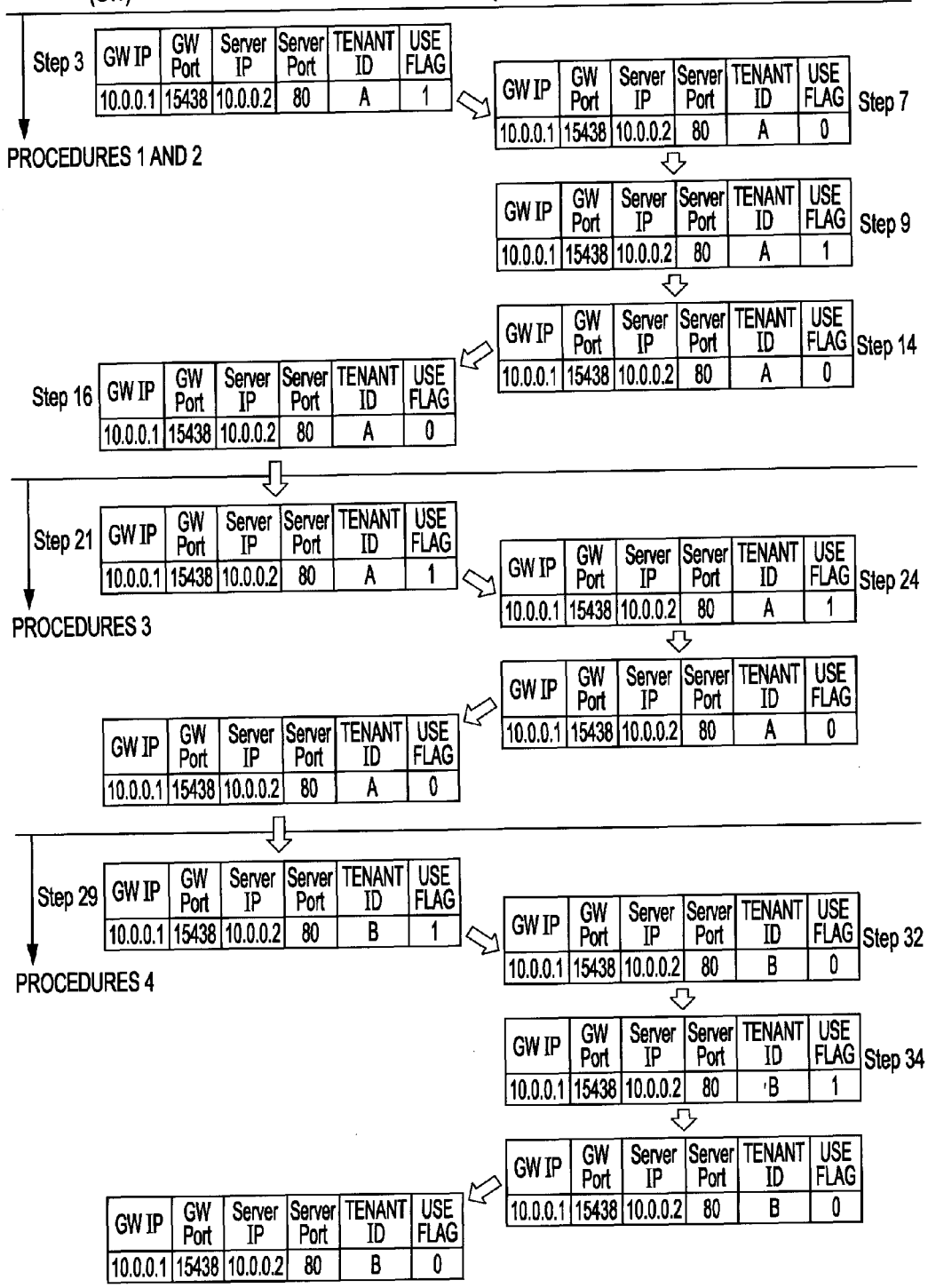
FIG. 10 illustrates a variation example of the tenant/connection relation table according to the first embodiment.
Figure 11:
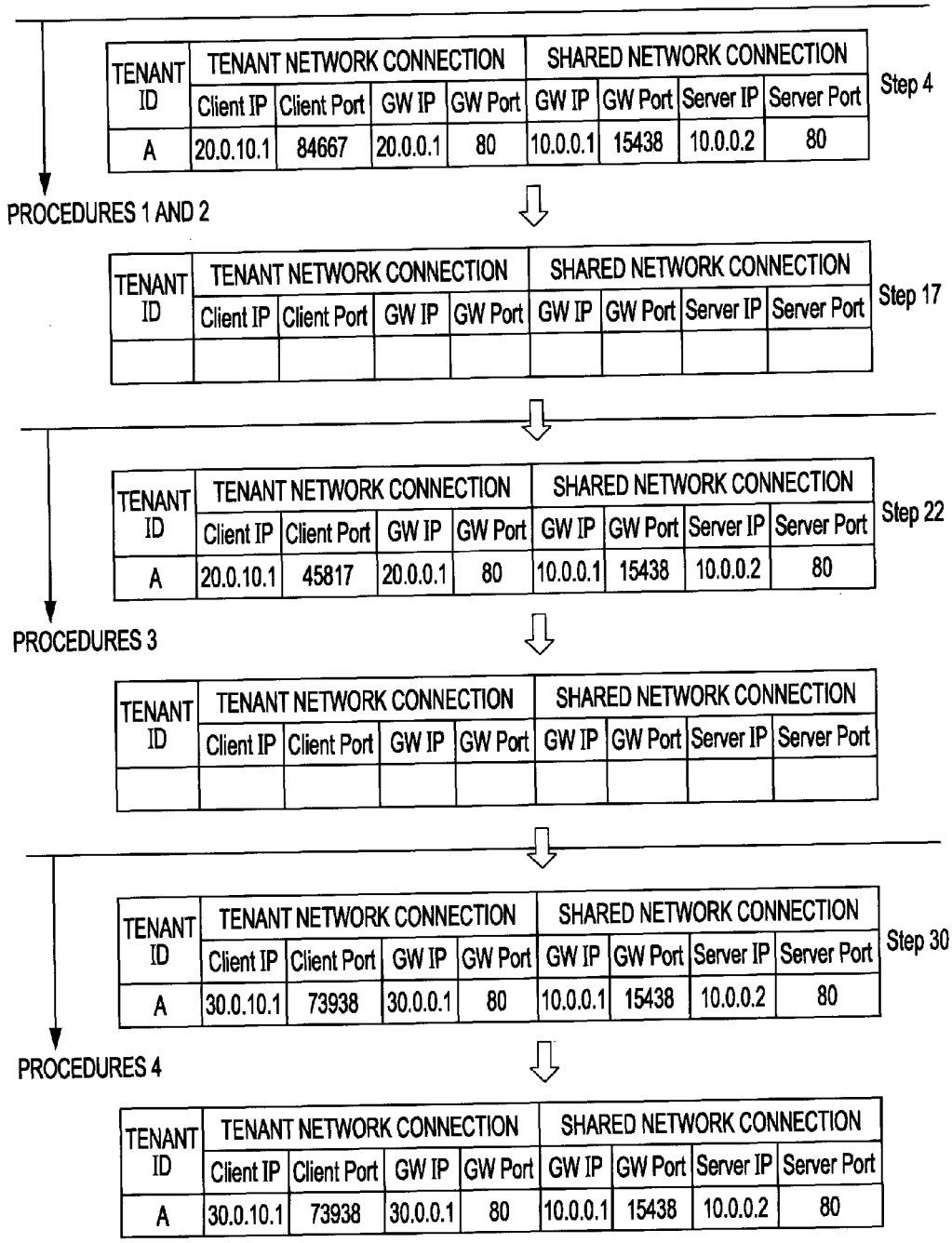
FIG. 11 illustrates a change in the connection relation table according to the first embodiment.

FIG. 10 illustrates a transition of the tenant/connection relation tables 4 and 7 in processing, and FIG. 11 illustrates a transition of the connection relation table in processing. Here, the "step n" in FIGS. 10 and 11 (n is a number) corresponds to the "S n" (n is a number) illustrated in the following description.

At first, the procedure 1 of sending a message from the clients in the tenant A to the shared server will be described using FIG. 8.

(S1) The client A1 transmits a request message for the shared application 8 to the GW 100. Here, it is assumed that a connection between the client A1 and the GW 100 is defined as a connection 1 and that the request message is transmitted to the GW 100 through the connection 1.

(S2) When the GW 100 receives the request message, the tenant identifying unit 1 identifies the tenant. Since the request message is received from the tenant A (destination IP address=20.0.0.1), the GW 100 searches the table for tenant identification (FIG. 9B), to obtain tenant ID="A". The relations between the respective tenants and the tenant IDs may be previously set in a table, for example, like FIG. 9B.

(S3) The connection identifying unit 2 searches the tenant/connection relation table 4 using the obtained tenant ID="A" as a search key. Since there is no corresponding entry, the connection identifying unit 2 newly defines the connection ID (GW IP=10.0.0.1, GW Port=15438, Server IP=10.0.0.2, Server Port=80) and adds the entry of the connection ID and tenant ID="A" and the use flag 1 in the tenant/connection relation table 4 (refer to FIG. 9A). Here, the connection of the new connection ID is defined as a connection 2. The IP address of the GW 100 of the connection 2 is a unique, fixed value previously set in the device and the port number of the GW 100 is the number autonomously selected by the GW 100. The correspondence between the IP address of the shared server 200 which the GW 100 is in charge of and the IP addresses (20.0.0.1/30.0.0.1) of the GW 100 which are opened to the respective tenants is previously set, and the IP address of the shared server 200 decides the destination server based on the packet header of the received message.

(S4) The connection identifying unit 2 records the correspondence among the tenant ID="A", the connection ID (Client IP=20.0.10.1, Client Port=84667, GW IP=20.0.0.1, GW Port=80) of the connection 1 on the tenant side, and the connection ID (GW IP=10.0.0.1, GW Port=15438, Server IP=10.0.0.2, Server Port=80) of the connection 2 on the shared network side (refer to FIG. 9C). The IP address and the port number of the above connection 1 make use of the values obtained from the packet header of the message received from the client A1.

(S5) The connection creating unit 3 of the GW 100 creates the connection 2 with the shared server 200, making use of the specified connection ID.

(S6) The connection creating unit 3 of the GW 100 transmits the tenant ID="A" to the shared server 200 through the connection 2.

(S7) The connection creating unit 6 of the shared server 200 adds the entry of the received tenant ID="A" and the connection ID (GW IP=10.0.0.1, GW Port=15438, Server IP=10.0.0.2, Server Port=80) of the connection 2 to the tenant/connection relation table 7.

(S8) The connection creating unit 3 of the GW 100 transmits a request message to the shared server 200, making use of the connection 2.

(S9) The connection creating unit 6 receives the request message through the connection 2 and passes the connection ID of the connection 2 to the connection identifying unit 5. Further, the connection creating unit 6 turns the use flag of the connection 2 to "1" in the tenant/connection relation table 7.

(S10) The connection identifying unit 5 searches the tenant/connection relation table 7 using the received connection ID of the connection 2, to obtain the tenant ID="A". Here, since the tenant ID is transmitted for the first connection, the tenant ID="A" may be received from the connection creating unit 6 instead of the table search.

(S11) The shared application 8 receives the request message and the tenant ID="A" and performs the processing for the tenant A.

Instead of using the same connection used for the message, another connection for exclusive use of tenant ID transmission may be used to inform the relation between the tenant ID and the connection ID.

Next, the procedure 2 of returning a response from the shared server 200 to the client A1 will be described. According to the procedure, when the shared application 8 completes the processing, the shared server returns a response message to the client A1, making use of the connection of the receiving time.

(S12) The shared application 8 of the shared server 200 passes the response message including the processing result and the tenant ID="A" to the connection identifying unit 5.

(S13) The connection identifying unit 5 passes the connection ID (GW IP=10.0.0.1, GW Port=15438, Server IP=10.0.0.2, Server Port=80) of the connection 2 to the connection creating unit 6, in order to transmit the response message, making use of the connection 2 having received the request message.

(S14) The connection creating unit 6 transmits the response message to the GW 100, making use of the received connection (namely, the connection 2) of the connection ID. Further, the connection creating unit 6 sets the use flag to zero in the entry of the connection 2 in the tenant/connection relation table 7 and passes the connection ID and the response message to the connection creating unit 3 of the GW 100.

(S15) The connection creating unit 3 passes the received connection ID of the connection 2 and the response message to the connection identifying unit 2.

(S16) The connection identifying unit 2 searches the tenant/connection relation table 4 for the received connection ID of the connection 2, to obtain the tenant ID="A". The connection identifying unit 2 sets the use flag to zero in the entry of the connection 2 in the tenant/connection relation table 4.

(S17) The connection identifying unit 2 reads the recorded correspondence between the connection 1 on the side of the tenant (tenant="A", Client IP=20.0.10.1, Client Port=84667, GW IP=20.0.0.1, GW Port=80) and the connection 2 on the side of the shared network (GW IP=10.0.0.1, GW Port=15438, Server IP=10.0.0.2, Server Port=80), deletes the above entry, and passes the connection ID of the connection 1 and the tenant ID="A" to the tenant identifying unit 1.

(S18) The tenant identifying unit 1 transmits the response message to the tenant, making use of the connection 1 on the side of the client, via the interface of the received tenant ID="A".

Next, after completion of the sequence of the procedures 1 and 2, the processing (procedure 3) of sending a message from the client A2 in the tenant A to the shared server will be described. Here, the description will be made in the case where the client A2 in the tenant A passes a message after completion of the processing up to the procedure 2 and reuses the connection 2 created between the GW 100 and the shared server 200.

(S19) The client A2 transmits a request message for the shared application 8 to the GW 100. Here, the connection for transmitting the request message is defined as a connection 3.

(S20) When the GW 100 receives the request message, the tenant identifying unit 1 identifies the tenant. Since the request message is received through the network of the tenant A, the tenant ID="A" is obtained.

(S21) The connection identifying unit 2 searches the tenant/connection relation table 4 using the obtained tenant ID="A" as a search key. Here, the connection identifying unit 2 obtains the unused connection 2 (GW IP=10.0.0.1, GW Port=15438, Server IP=10.0.0.2, Server Port=80) (use flag=0). The connection identifying unit 2 sets the use flag at "1" in the entry of the connection 2 in the tenant/connection relation table 4.

(S22) The connection identifying unit 2 records the correspondence among the tenant ID="A", the connection 3 on the side of the tenant (Client IP=20.0.10.2, Client Port=45817, GW IP=20.0.0.1, GW Port=80), and the connection 2 on the side of the shared network (GW IP=10.0.0.1, GW Port=15438, Server IP=10.0.0.2, Server Port=80), as illustrated in FIG. 9C.

(S23) The connection creating unit 3 of the GW 100 transmits the request message from the client A2, to the shared server 200, making use of the connection 2.

(S24) The connection creating unit 6 receives the request message through the connection 2 and passes the connection ID of the connection 2 to the connection identifying unit 5.

The connection creating unit 6 sets the use flag of the connection 2 at "1" in the tenant/connection relation table 7.

(S25) The connection identifying unit 5 searches the tenant/connection relation table 7 for the received connection ID of the connection 2, and obtains the tenant ID="A".

(S26) The shared application 8 receives the request message and the tenant ID="A" and performs the processing for the tenant A.

Next, after completion of the processing for the tenant A, the processing (procedure 4) of sending a message from the client B1 in the tenant B to the shared server 200 will be described. Here, the description will be made about the case where the client B1, in the tenant B, passes a message to the shared server after the completion of the processing up to the procedure 3 and reuses the connection 2 created between the GW 100 and the shared server 200. Namely, there may be no uncreated connection and no unused connection for the tenant B.

(S27) The client B1 transmits a request message for the shared application 8 to the GW 100. The connection for transmitting the request message is defined as a connection 4.

(S28) When the GW 100 receives the request message, the tenant identifying unit 1 identifies the tenant. Since the request message is received through the network of the tenant B, the tenant ID="B" is obtained.

(S29) The connection identifying unit 2 searches the tenant/connection relation table 4 using the obtained tenant ID="B" as a search key. Since the connection identifying unit 2 does not find the unused connection having the tenant ID="B" (use flag=0) and there is no uncreated connection, the unused connection 2 for the tenant A (use flag=0) is used. The connection identifying unit 2 sets the use flag of the connection 2 at "1" in the tenant/connection relation table 4 and changes the tenant ID to the tenant ID="B".

(S30) The connection identifying unit 2 records the correspondence among the tenant ID="B", the connection 4 on the side of the tenant (Client IP=30.0.10.1, Client Port=73938, GW IP=30.0.0.1, GW Port=80), and the connection 2 on the side of the shared network (GW IP=10.0.0.1, GW Port=15438, Server IP=10.0.0.2, Server Port=80), as illustrated in FIG. 9C.

(S31) The connection creating unit 3 of the GW 100 notifies the shared server 200 that the above connection 2 is changed to the tenant ID="B".

(S32) The connection creating unit 6 of the shared server 200 changes the entry of the connection ID (GW IP=10.0.0.1, GW Port=15438, Server IP=10.0.0.2, Server Port=80) of the connection 2 to the received tenant ID="B", in the tenant/connection relation table 7.

(S33) The connection creating unit 3 of the GW 100 transmits the request message to the shared server 200, making use of the above connection 2.

(S34) The connection creating unit 6 receives the request message and passes the connection ID of the connection 2 to the connection identifying unit 5. The connection creating unit 6 sets the use flag of the connection 2 to "1" in the tenant/connection relation table 7.

(S35) The connection identifying unit 5 searches the tenant/connection relation table 7 using the received connection ID of the connection 2, to obtain the tenant ID="B".

(S36) The shared application 8 receives the request message and the tenant ID="B" and performs the processing for the tenant B.

In the first embodiment, the description has been made about the case where the GW 100 creates a new connection at a receiving time of a request message; however, a specific number of connections may be created between the GW 100 and the shared server 200 before communication, and the relations between the tenant IDs and the connection IDs may be kept previously. In this case, the procedure 1 of creating a connection and transmitting the tenant ID is omitted.

Figure 12:
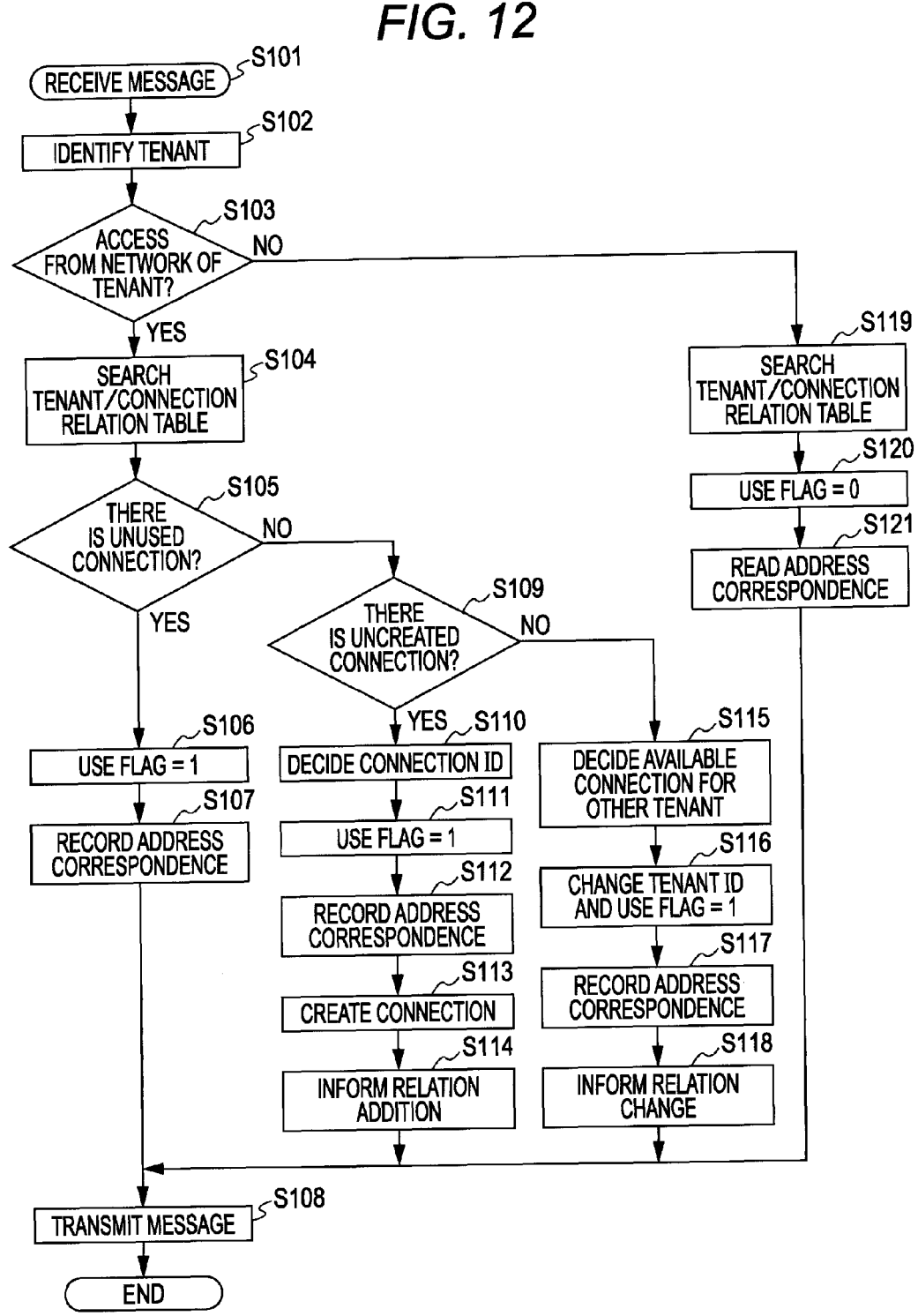
FIG. 12 is a flow chart of the processing by the GW according to the first embodiment.

Next, the processing in the GW 100 will be described with reference to the flow chart of FIG. 12.

The tenant identifying unit 1 receives a message (S101). The tenant identifying unit 1 identifies the tenant by searching the table of FIG. 9B for the IP address of the GW 100 having received the message as a search key and obtains the tenant ID (S102). The tenant identifying unit 1 checks whether the obtained message is a message coming from the shared server 200, provided that there is no entry in the table of FIG. 9B.

The tenant identifying unit 1 checks whether the access is from a tenant or from the shared server 200 (S103). Here, when the access is from a tenant (S103, Y), the connection identifying unit 2 searches the tenant/connection relation table 4 using the tenant ID obtained in S102 as a search key (S104). The connection identifying unit 2 checks whether there is an unused connection, based on the search result (S105). When there is an unused connection (S105, Y), the connection identifying unit 2 sets the use flag of the corresponding unused connection at "1", in the tenant/connection relation table 4 (S106), and records the correspondence among the tenant ID, the connection ID on the side of the tenant, and the connection ID on the side of the shared network (refer to FIG. 9C) (S107). Thereafter, the connection creating unit 3 transmits the message to the shared server (S108).

When the connection identifying unit 2 judges that there is no unused connection in S105 (S105, N), the connection identifying unit 2 checks whether there is an uncreated connection (S109). When it is judged that there is an uncreated connection (S109, Y), the connection identifying unit 2 decides the connection ID (S110) and adds the entry of the decided connection ID, the tenant ID, and the use flag=1 to the tenant/connection relation table 4 (S111). Then, the connection identifying unit 2 records the correspondence of the address illustrated in FIG. 9C (S112).

The connection creating unit 3 creates a connection to the connection creating unit 6 of the shared server 200 (S113), informs the shared server 200 of the tenant ID of the created connection, and requests the shared server 200 to add the related connection ID to the tenant/connection relation table 7 (S114). The connection creating unit 3 performs the processing in S108.

When it is judged that there is no uncreated connection in S109 (S109, N), the connection identifying unit 2 decides an available connection for the other tenant with reference to the tenant/connection relation table 4 (S115). The connection identifying unit 2 changes the tenant ID in the entry of the corresponding connection in the tenant/connection relation table 4 and sets the use flag to "1" (S116). The connection identifying unit 2 records the correspondence of the address illustrated in FIG. 9C (S117). Making use of the above connection, the connection creating unit 3 informs the shared server 200 of the tenant ID and requests the shared server 200 to add the related connection ID to the tenant/connection relation table 7 (S118). Then, the processing in S108 will be performed.

When an access from none of the tenants in S103 occurs, in other words, when the access is from the shared server 200 (S103, N), the connection identifying unit 2 searches the tenant/connection relation table 4 using the connection ID of the connection having received the message, to obtain the tenant ID (S119). Further, the connection identifying unit 2 sets the use flag of the entry of the above connection at "0" in the tenant/connection relation table 4 (S120).

The connection identifying unit 2 reads the recorded correspondence (FIG. 9C) between the connection ID on the side of the tenant and the connection ID on the side of the shared network, deletes the above entry, and passes the connection ID and the tenant ID of the client to the tenant identifying unit 1 (S121).

The tenant identifying unit 1 transmits a response message, by using the connection on the side of the client, via the interface of the given tenant ID (S108).

Figure 13:
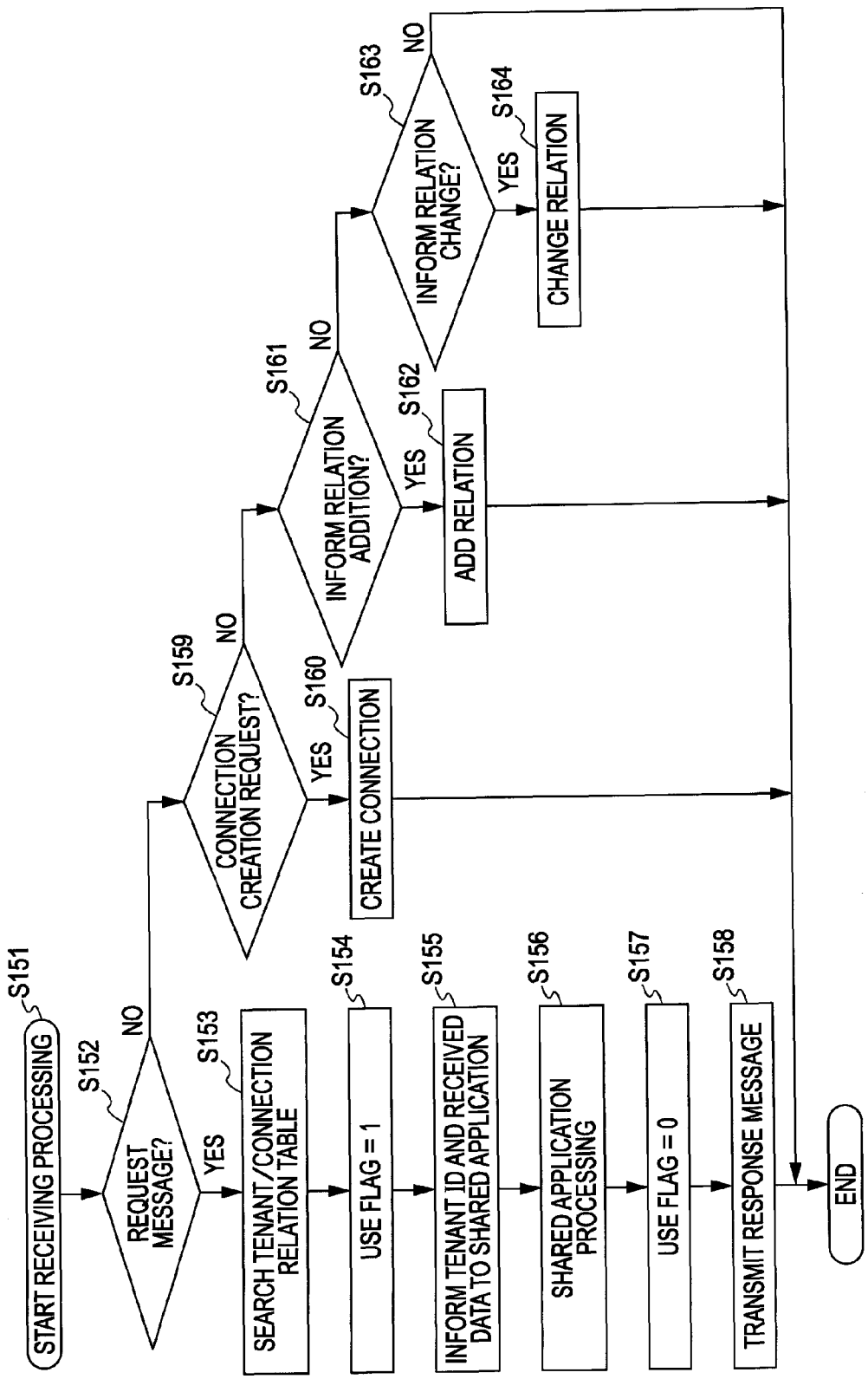
FIG. 13 is a flow chart illustrating the processing by the shared server according to the first embodiment.

Next, the processing in the shared server 200 will be described with reference to the flow chart of FIG. 13.

The connection creating unit 6 receives a message from the GW 100 (S151) and checks whether or not the received message is a request message going to the shared application 8 (S152).

When the received message is the request message (S152, Y), the connection creating unit 6 passes the connection ID of the connection having received the request message and the request message to the connection identifying unit 5. The connection identifying unit 5 searches the tenant/connection relation table 7 for the obtained connection ID, to obtain the tenant ID (S153).

The connection creating unit 6 sets the use flag of the corresponding connection at "1" in the tenant/connection relation table 7 (S154). The connection identifying unit 5 informs the shared application 8 of the tenant ID and the request message obtained in S153 (S155).

The shared application 8 receives the tenant ID and request message and performs the processing for the received tenant ID (S156). After completion of the processing, the shared application 8 passes a response message including the processing result and the tenant ID to the connection identifying unit 5. The connection identifying unit 5 passes the connection ID to the connection creating unit 6, in order to transmit the response message by making use of the connection having received the request message.

The connection creating unit 6 searches the tenant/connection relation table 7 for the obtained connection ID and sets the use flag of the searched entry to "0" (S157). The connection creating unit 6 transmits the response message to the connection creating unit 3 (S158).

When it is judged that the message is not a request message in S152 (S152, N), and when the message is a connection creating request (S159, Y), the connection creating unit 6 creates a connection (S160) by adding the entry of the received tenant ID and connection ID to the tenant/connection relation table 7.

When the above message is a notification (the notification in S114) to add the related connection (S161, Y), the connection creating unit 6 adds the related entry to the tenant/connection relation table 7 (S162). When the above message is a notification (the notification in S118) to change the related entry (S163, Y), the connection creating unit 6 changes the tenant ID in the corresponding entry in the tenant/connection relation table 7 (S164).

According to the structure and processing as mentioned above, it is possible to establish communication without embedding the tenant ID of each tenant into all the messages, because the tenant ID is notified only when creating a connection between the GW 100 and the shared server 200. Therefore, the processing of writing and reading the tenant IDs in all the packets/messages becomes unnecessary. This may improve the performance of the GW and the shared server.

(Second Embodiment)

A second embodiment describes a system which embeds a tenant ID only into a first message transmitted by GW, to inform a shared server of the relation between a connection and the tenant ID, and embeds a tenant ID into a message only when the GW changes the relation between the connection and the tenant, to inform the shared server of the relation between the connection and the tenant ID.

Figure 14:
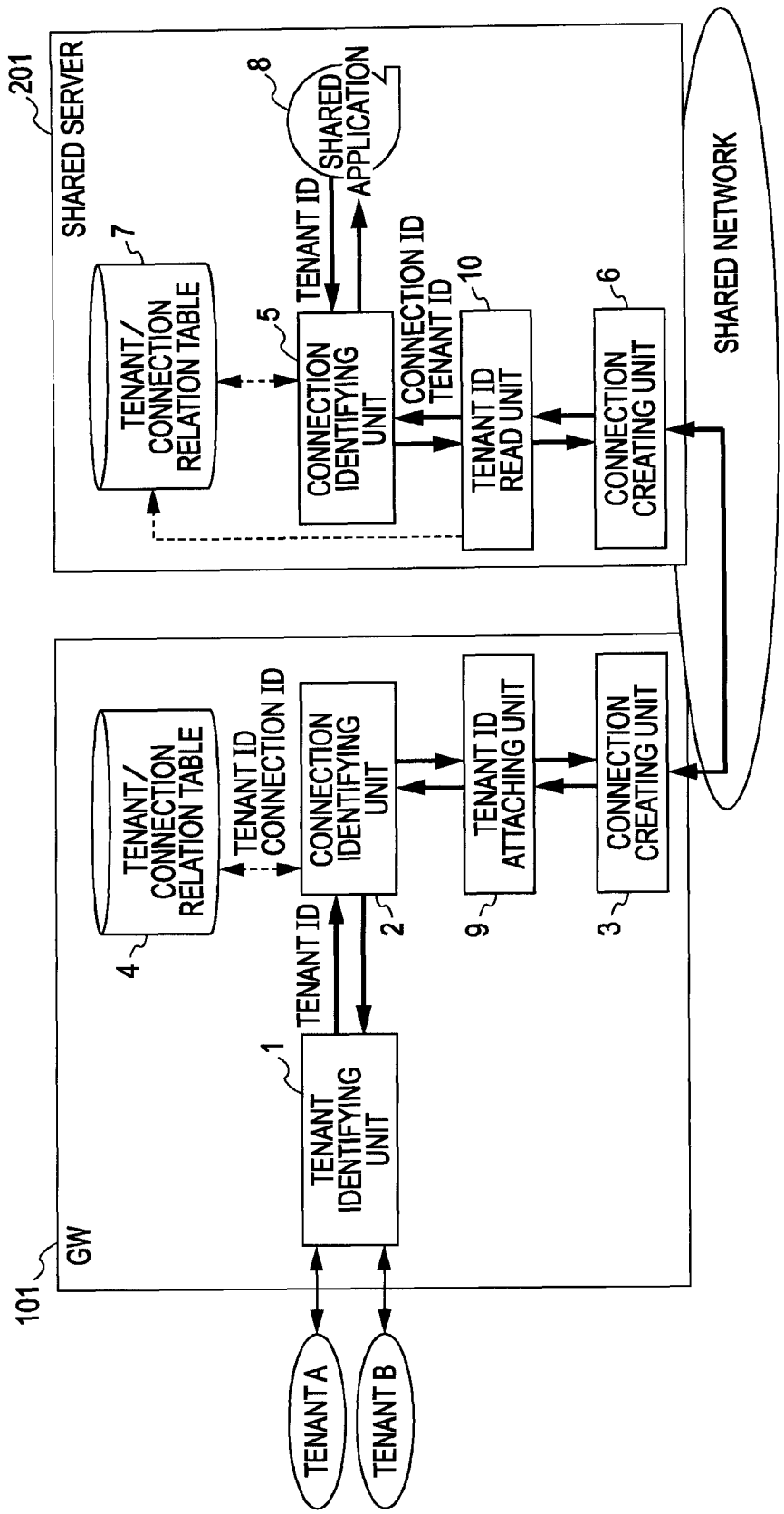
FIG. 14 is a functional block diagram according to a second embodiment.

The functional structure in the second embodiment is illustrated in FIG. 14. The processing in the GW 101 is illustrated in the flow chart of FIG. 15 and the processing in the shared server 201 is illustrated in the flow chart of FIG. 16.

The GW 101 according to the second embodiment further includes a tenant ID attaching unit 9, in addition to the GW 100 of the first embodiment, and the shared server 201 further includes a tenant ID reading unit 10, in addition to the shared server 200 of the first embodiment (refer to FIG. 14).

The tenant ID attaching unit 9 enters a tenant ID and a creation/update instruction into a request message when a new connection is created and when the relation between the connection and the tenant is changed at reception of the request.

When the tenant ID and the creation/update instruction is in the message, the tenant ID reading unit 10 reads the relation of the received connection ID and tenant ID, and performs the creation/change processing in the corresponding entry of the tenant/connection relation table 7.

Since the functional blocks other than the above are the same as in the first embodiment, description thereof is omitted.

Hereinafter, a description will be made about the processing (corresponding to the procedure 1 in the first embodiment) of sending a message from the client A1 in the tenant A to a shared server and the processing (corresponding to the procedure 4 in the first embodiment) of sending a message from the client B1 in the tenant B to the shared server after completion of the processing in the tenant A, according to the second embodiment.

At first, the processing of sending a message from the client A1 in the tenant A to the shared server, according to the second embodiment, will be described.

The client A1 transmits a request message for the shared application 8 to the GW 101. The connection which is used here is defined as a connection 1. When the GW 101 receives the request message, the tenant identifying unit 1 identifies the tenant. Since the above is received through the network of the tenant A, the GW 101 obtains the tenant ID="A". The relations between the networks and the tenant IDs may be previously set in a table, for example, like FIG. 9B, similarly to the first embodiment.

The connection identifying unit 2 searches the tenant/connection relation table 4 using the obtained tenant ID="A" as a search key. Since there is no corresponding entry, the connection identifying unit 2 newly decides the connection ID (GW IP=10.0.0.1, GW Port=15438, Server IP=10.0.0.2, Server Port=80) (the connection corresponding to the connection ID is defined as a connection 2), similarly to the first embodiment, and adds the entry of the above connection ID and tenant ID="A" and the use flag 1 to the tenant/connection relation table 4 (refer to FIG. 9A).

The connection identifying unit 2 records the correspondence among the tenant ID="A", the connection 1 on the side of the tenant (Client IP=20.0.10.1, Client Port=84667, GW IP=20.0.0.1, GW Port=80), and the connection 2 on the side of the shared network (GW IP=10.0.0.1, GW Port=15438, Server IP=10.0.0.2, Server Port=80) (refer to FIG. 9C).

Figure 17:
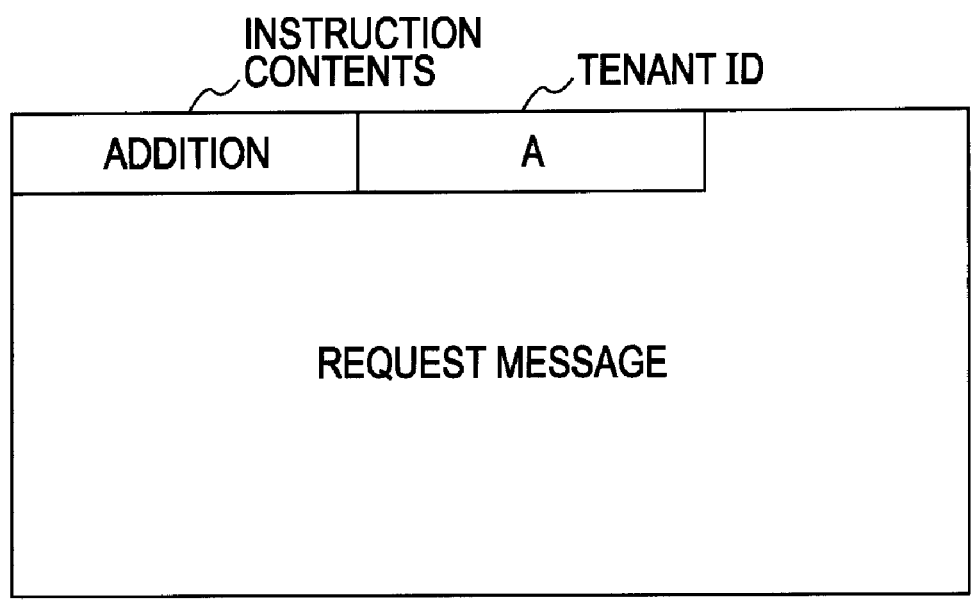
FIG. 17 illustrates the structure of a request message according to the second embodiment.

Since a connection is newly created, the tenant ID attaching unit 9 enters the specified tenant ID="A" and an "addition" request into the message. For example, when an input region is provided at the head of a message, as illustrated in FIG. 17, the tenant ID attaching unit 9 embeds the specified contents (add or change) and the tenant ID into the message.

The connection creating unit 3 of the GW 101 creates a connection between itself and the shared server, making use of the connection 2 of the specified connection ID. The connection creating unit 3 of the CW 101 transmits the request message to the shared server 201, making use of the connection 2. The connection creating unit 6 of the shared server 201 receives the request message and passes the request message to the tenant ID reading unit 10.

The tenant ID reading unit 10 reads out the tenant ID="A" from the message and adds the entry of the tenant ID, the connection ID of the connection 2 (GW IP=10.0.0.1, GW Port=15438, Server IP=10.0.0.2, Server Port=80), and the use flag=1 to the tenant/connection relation table 7.

The connection identifying unit 5 searches the tenant/connection relation table 7 using the received connection ID of the connection 2, to obtain the tenant ID="A". Since the tenant ID is transmitted in the first message, the tenant ID="A" may be received from the connection creating unit 6, instead of the table search. The shared application 8 receives the request message and the tenant ID="A" and performs the processing for the tenant A.

Next, the processing of sending a message from the client B1 in the tenant B to the shared server, after completion of the processing in the above tenant A, will be described.

The client B1 transmits a request message for the shared application 8 to the GW 101. The connection used here is defined as a connection 4.

When the GW 101 receives the request message, the tenant identifying unit 1 identifies the tenant with reference to the table of FIG. 9B. Since the above is received through the network of the tenant B, the GW 101 obtains the tenant ID="B".

The connection identifying unit 2 searches the tenant/connection relation table 4 using the obtained tenant ID="B" as a search key. Since the connection identifying unit 2 does not find an unused connection having the tenant ID="B" (use flag=0) and there is no uncreated connection, the unused connection 2 (use flag=0) for the tenant A is used. The connection identifying unit 2 sets the use flag of the connection 2 at "1" in the tenant/connection relation table 4 and changes the tenant ID into "B".

The connection identifying unit 2 records the correspondence among the tenant ID="B", the connection 4 on the side of the tenant (Client IP=30.0.10.1, Client Port=73938, GW IP=30.0.0.1, GW Port=80), and the connection 2 on the side of the shared network (GW IP=10.0.0.1, GW Port=15438, Server IP=10.0.0.2, Server Port=80).

The tenant ID attaching unit 9 enters the specified tenant ID="B" and a request to "change" into the message. The connection creating unit 3 of the GW 101 transmits the request message to the shared server 201, making use of the connection 2.

The connection creating unit 6 of the shared server 201 receives the request message and passes the request message to the tenant ID reading unit 10. The tenant ID reading unit 10 reads the tenant ID="B" from the message and changes the tenant ID into "B" in the entry about the connection 2 (having the connection ID (GW IP=10.0.0.1, GW Port=15438, Server IP=10.0.0.2, Server Port=80)) in the tenant/connection relation table 7 and sets the use flag to "1".

The connection identifying unit 5 searches the tenant/connection relation table 7 for the received connection ID of the connection 2, to obtain the tenant ID="B". The shared application 8 receives the request message and the tenant ID="B" and performs the processing for the tenant B.

Figure 15:
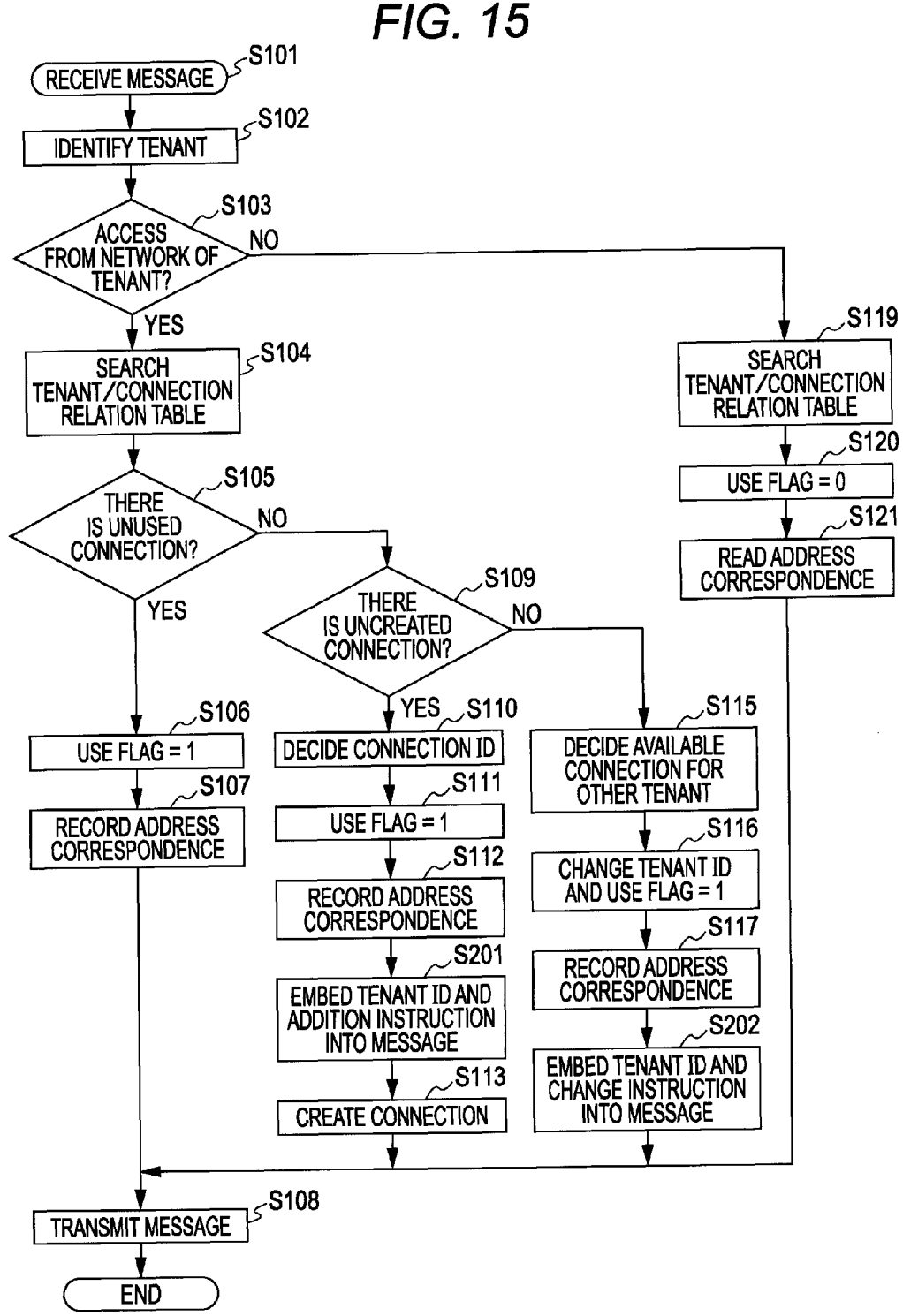
FIG. 15 is a flow chart of the processing by the GW according to the second embodiment.

The processing by the GW 101 according to the second embodiment will be described with reference to the flow chart of FIG. 15. The same reference numerals are used for the same processing as that of the GW 100 (FIG. 12) according to the first embodiment; therefore, description thereof is omitted here and only points that are different from the processing of the first embodiment will be described.

After the processing in S112, the tenant ID attaching unit 9 embeds the tenant ID and the addition instruction into the message (S201), and the connection creating unit 3 creates a connection between itself and the connection creating unit 6 of the shared server 201 (S113).

Further, after the processing in S117, the tenant ID attaching unit 9 embeds the tenant ID and the change instruction into the message (S202) and transmits the message to the shared server (S108).

Figure 16:
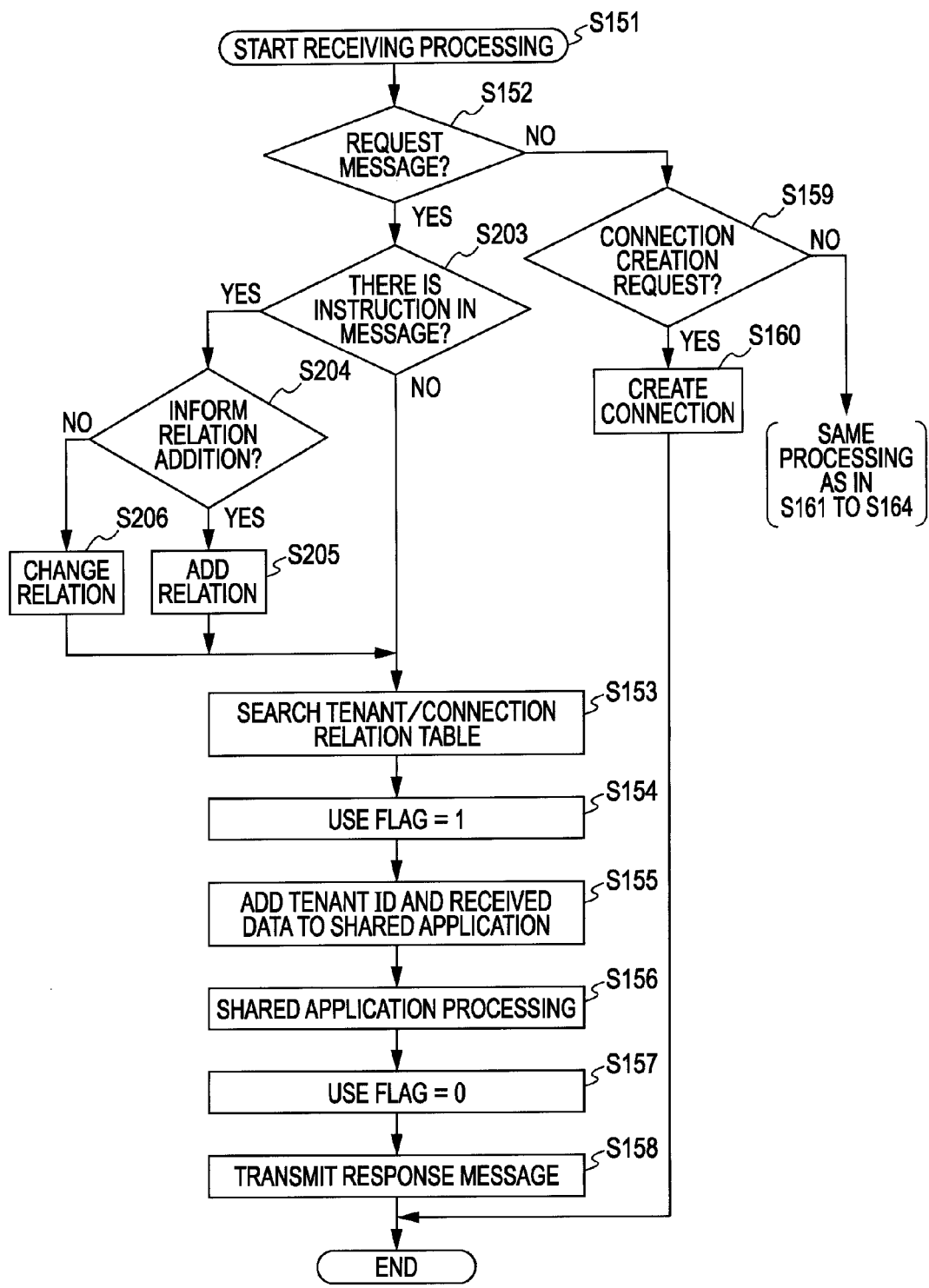
FIG. 16 is a flow chart of the processing by the shared server according to the second embodiment.

The processing by the shared server 201 according to the second embodiment will be described with reference to the flow chart of FIG. 16. Since the same reference numerals are attached to the same processing as that (FIG. 13) of the shared server 200 according to the first embodiment, description thereof is omitted and only the points that differ from that of the first embodiment will be described.

When it is judged to be a request message (S152, Y) in S152 for checking whether the message is a request message or not, the tenant ID reading unit 10 checks whether there is an addition or change instruction by checking the instruction in the message as illustrated in FIG. 17 (S203). When there is an instruction in the message (S203, Y), the tenant ID reading unit 10 checks whether the instruction is an addition instruction or not (S204).

When it is the addition instruction (S204, Y), the tenant ID reading unit 10 adds the relation to the tenant/connection relation table 7 (S205). When it is not the addition instruction (S204, N), the tenant ID reading unit 10 changes the related tenant ID in the tenant/connection relation table 7 (S206).

As mentioned above, it is possible to reduce a network delay in the notification processing by embedding a tenant ID into a message at an appropriate timing, without separately performing the notification processing on a connection, and also reduce the load in the processing according to the connection diversion.

(Third Embodiment)

Figure 18:
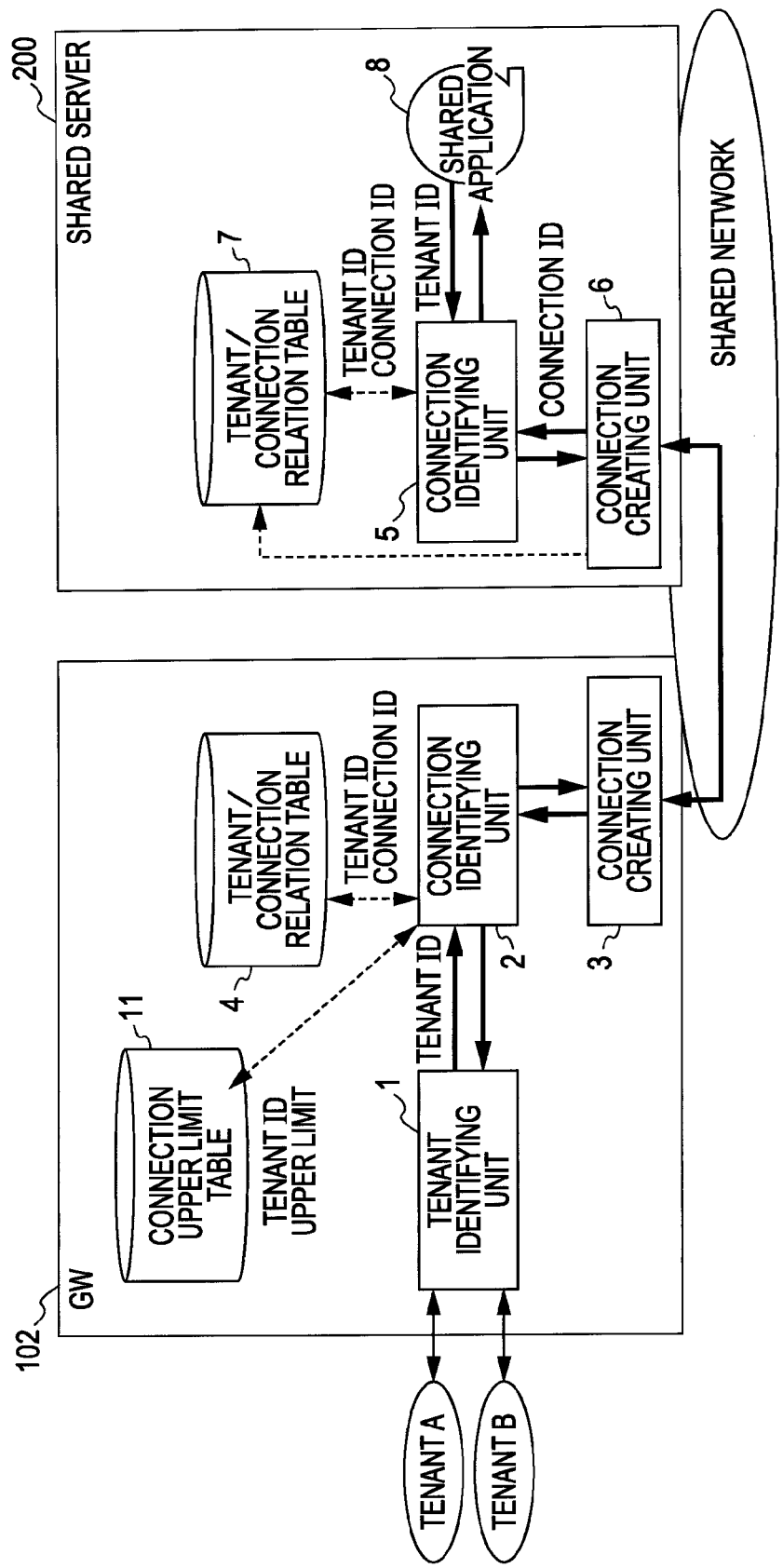
FIG. 18 illustrates a functional block according to a third embodiment.

A third embodiment describes a method of providing an upper limit of the number of connections available between the GW and the shared server for every tenant. FIG. 18 illustrates the functional structure according to the third embodiment. The functional structure and the flow chart of the shared server are the same as in the first embodiment.

The GW 102 of the third embodiment has a connection upper limit table 11 in addition to the GW 100 of the first embodiment. The connection upper limit table 11 is a table for keeping the upper limit of the connections between the GW 102 and the shared server 200 for every tenant.

Before the connection identifying unit 2 diverts the connection from another tenant, when the number of connections reaches the upper limit registered in the connection upper limit table 11, error processing is performed. The following error processing may be considered: a request message may be abandoned, an error message may be sent to a client, and the client may be kept waiting until there arises a vacant connection in the same tenant while holding the request message.

Figure 20:
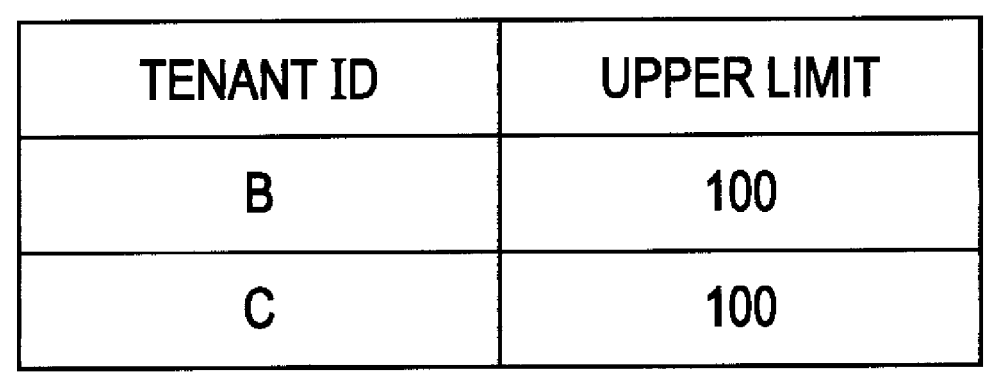

The entry of the connection upper limit table 11 may be set as illustrated in FIG. 20, and when the tenant B uses the upper limit of 100 connections, the procedure 4 of the first embodiment will be changed as follows.

The client B1 transmits a request message for the shared application 8 to the GW 102. When the GW 102 receives the request, the tenant identifying unit 1 identifies the tenant. Since the above is received through the network of the tenant B, the GW 102 obtains the tenant ID="B". The connection identifying unit 2 searches the tenant/connection relation table 4 using the obtained tenant ID="B" as a search key. Since the GW 102 does not find an unused connection having the tenant ID="B" (use flag=0) and since there is no uncreated connection, the connection identifying unit 2 reads out the entry (upper limit 100) of the connection upper limit table 11.

The connection identifying unit 2 counts the number of entries by the tenant B in the tenant/connection relation table 4. In this example, since the number of entries already reaches the upper limit, the received request message is abandoned according to the error processing.

In order to avoid imposing restrictions on a specified tenant, it is desirable to not add tenant entries to the connection upper limit table 11.

Figure 19:
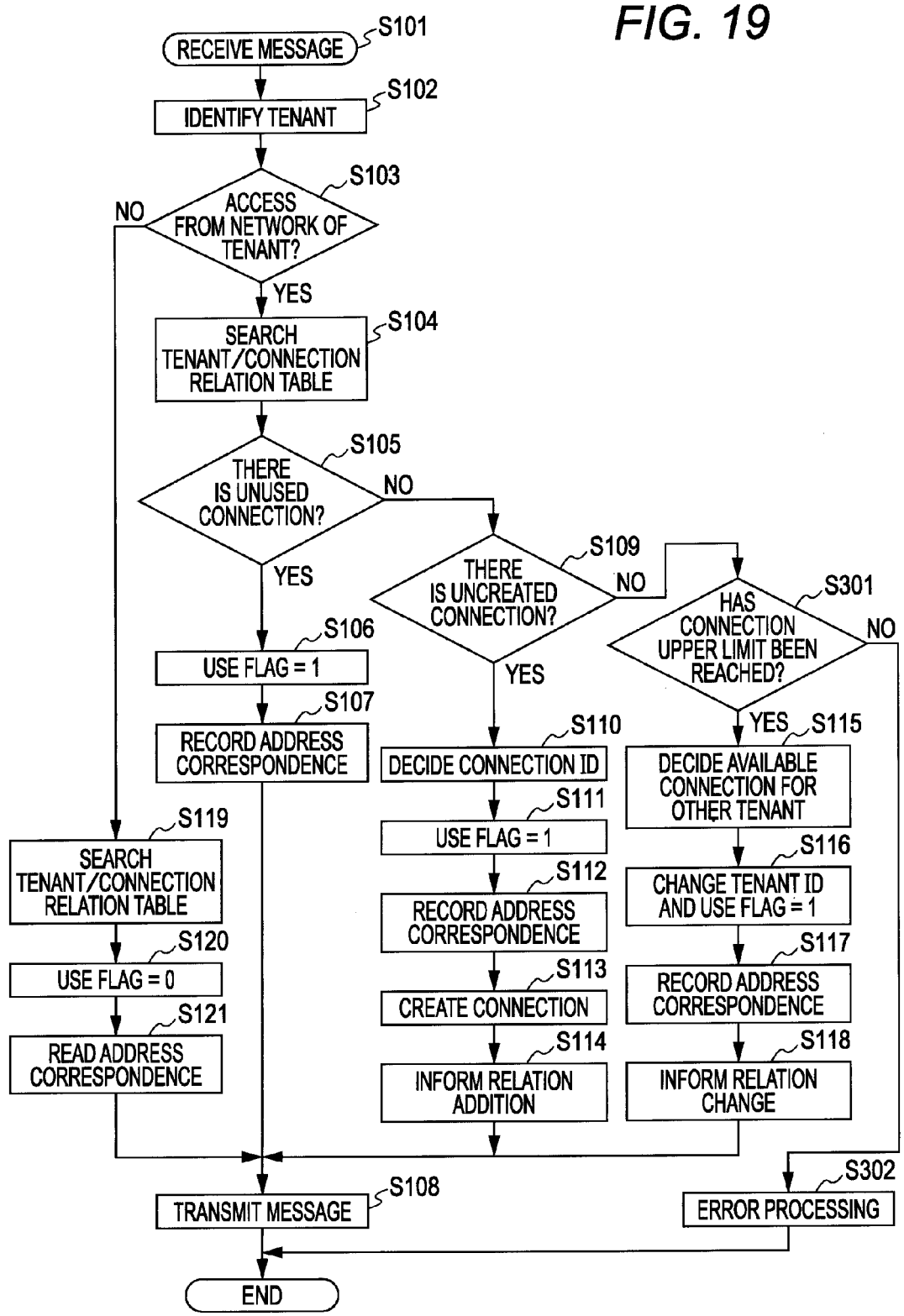
FIG. 19 is a flow chart of the processing by the GW according to the third embodiment.

Next, the processing by the GW 102 in the third embodiment is illustrated in the flow chart of FIG. 19. Since the same reference numerals are attached to the same processing as in the GW 100 of the above first embodiment, description thereof is omitted.

When the connection identifying unit 2 judges that there is no uncreated connection (S109, N) in S109, the connection identifying unit 2 checks whether the number of the connections for the current tenant ID reaches the upper limit, with reference to the connection upper limit table 11 (S301). When the number of the connections reaches the upper limit (S301, Y), the processing in S115 is performed, while when the number of the connections does not reach the upper limit (S301, N), the connection identifying unit 2 performs the error processing (S302).

As mentioned above, in re-using a connection, the upper limit may be set and accordingly, it is possible to avoid a specified tenant's wasteful use of connections.

(Fourth Embodiment)

A fourth embodiment describes a structure in which, instead of the tenant/connection relation tables respectively provided in the GW and the shared server, a relation management server is prepared and the tenant/connection relation table is managed in the relation management server.

Figure 21:
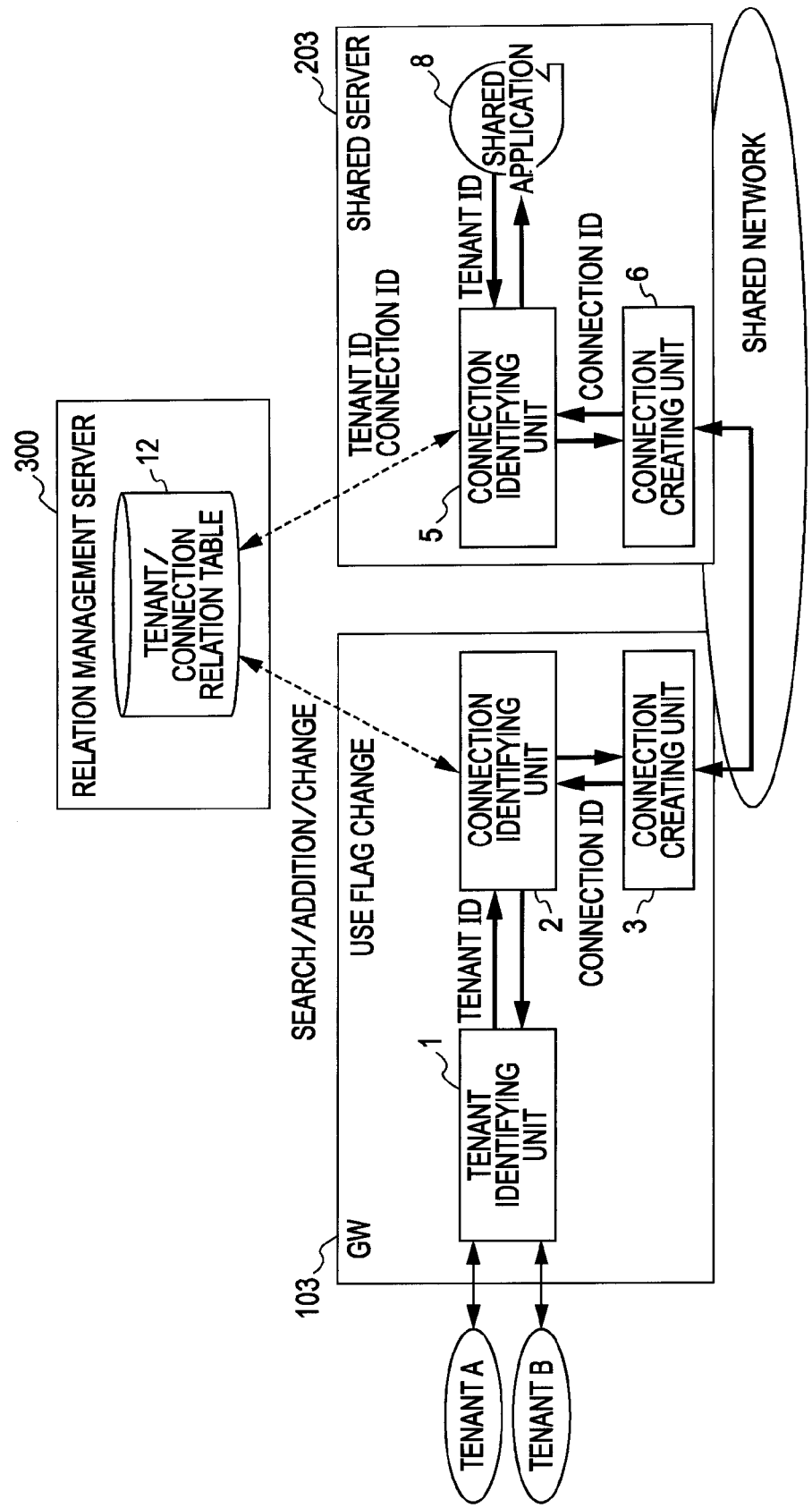
FIG. 21 is a functional block diagram of a fourth embodiment.

The functional structure in the fourth embodiment is illustrated in FIG. 21. In the fourth embodiment, the tenant/connection relation table 4 in the GW 100 in the first embodiment and the tenant/connection relation table 7 in the shared server 200 in the first embodiment are removed. Instead, a relation management server 300 having a tenant/connection relation table 12 is prepared. Here, the tenant/connection relation table 12 has the same function of keeping the relations between the connection IDs and the tenant IDs, similarly to the tenant/connection relation table 4 and the tenant/connection relation table 7 (refer to FIG. 9A).

The fundamental processing flow is the same as that of the first embodiment; however, the processing of update and reference to the tenant/connection relation table performed by a GW 103 and a shared server 203 is realized through the relation management server 300. Namely, the GW 103 and the shared server 203 requests the relation management server 300 to do the update and reference processing so that the relation management server 300 updates and refers to the internal tenant/connection relation table 12.

Figure 22:
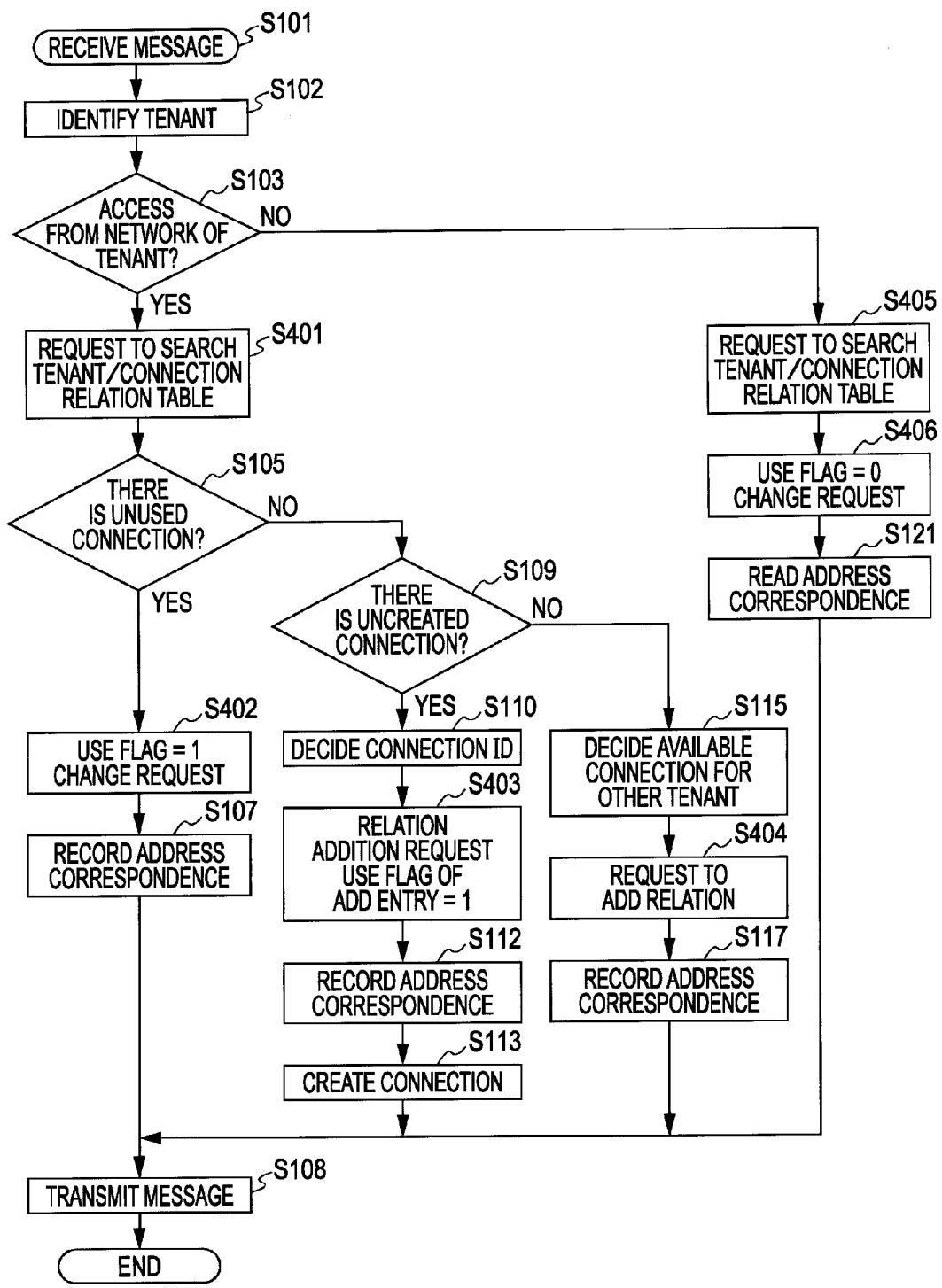
FIG. 22 is a flow chart of the processing by the GW according to the fourth embodiment.
Figure 24:
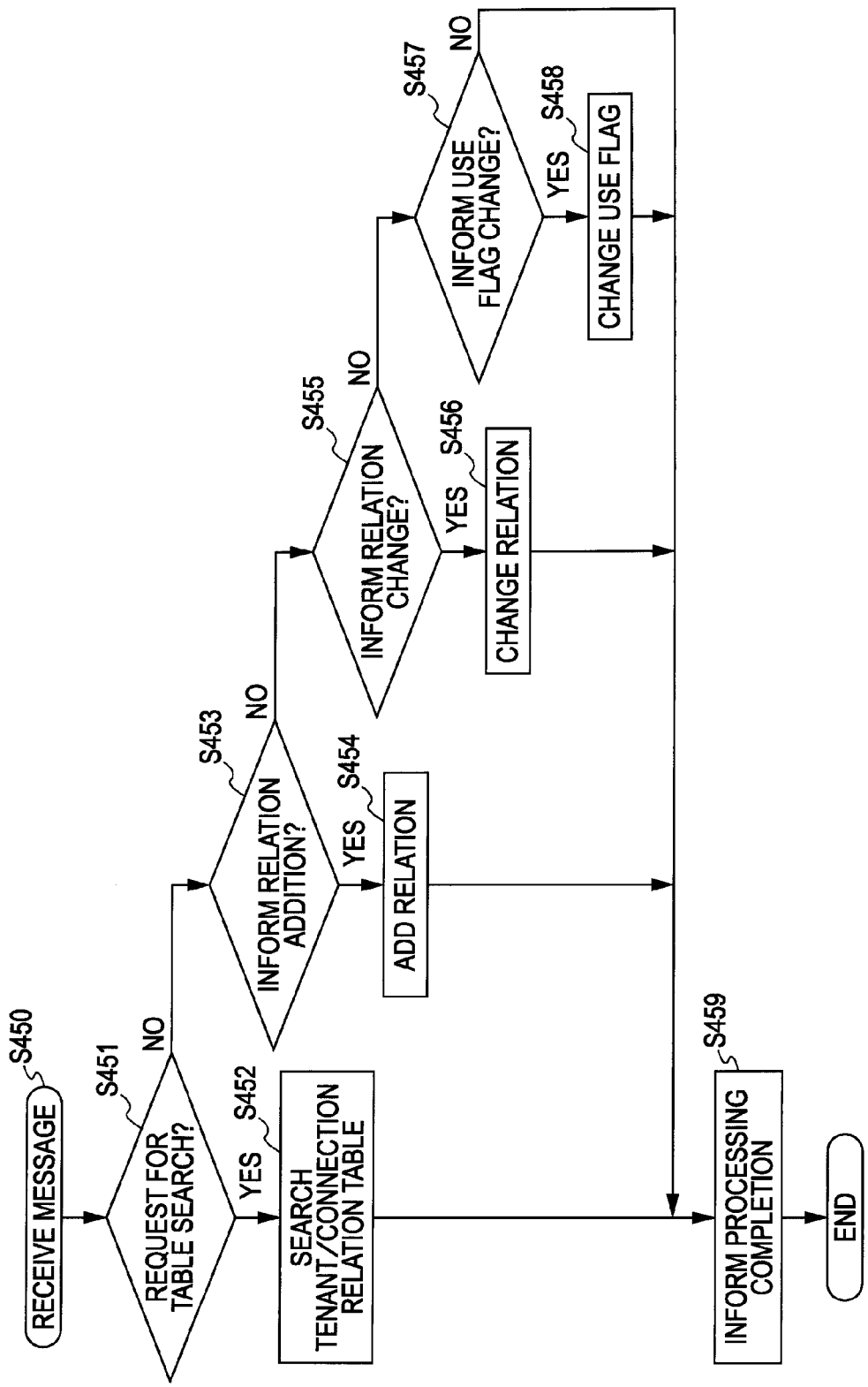
FIG. 24 is a flow chart of the processing by a relation management server according to the fourth embodiment.

The processing by the GW 103 of this embodiment is illustrated in the flow chart of FIG. 22, the processing by the shared server 203 is illustrated in the flow chart of FIG. 19, and the processing by the relation management server 300 is illustrated in the flow chart of FIG. 24. The processing by the GW 103 and the shared server 203 is substantially the same as that of the first embodiment, except that the update and reference processing to the tenant/connection relation tables 4 and 7 in the first embodiment (S104, S106, S111, S116, S119, S120, S153, and S154 in FIGS. 12 and 13) becomes the processing of requesting the relation management server 300 (S401, S402, S403, S404, S405, S406, S407); therefore, the description of the processing by the GW 103 and the shared server 203 is omitted.

The processing by the relation management server 300 will be described with reference to FIG. 24.

The relation management server 300 receives a request message from the GW103 or the shared server 203 (S450). When the request message is a request for table search in S401, S405, or S407 (S451, Y), the relation management server 300 searches the tenant/connection relation table 12 using the data attached to the request message as a search key (S452) and informs the processing result to the GW 103 or the shared server 203 which has transmitted the request message (S459).

When the request message is a request for adding the relation in S403 (S453, Y), the relation management server 300 adds the entry of the relation to the tenant/connection relation table 12 and sets the use flag to "1" in the added entry (S454). Thereafter, the relation management server 300 informs the GW 103 or the shared server 203 (S459) of the completion of the processing.

When the request message is a request for changing the relation in S404 (S455, Y), the relation management server 300 changes the correspondence in the tenant/connection relation table 12 (S456). Then, the relation management server 300 informs the completion of the processing (S459).

When the request message is a request for changing the use flag in S406 (S457, Y), the relation management server 300 changes the use flag of the corresponding entry in the tenant/connection relation table 12 (S458). Then, the relation management server 300 reports the completion of the processing (S459).

Figure 23:
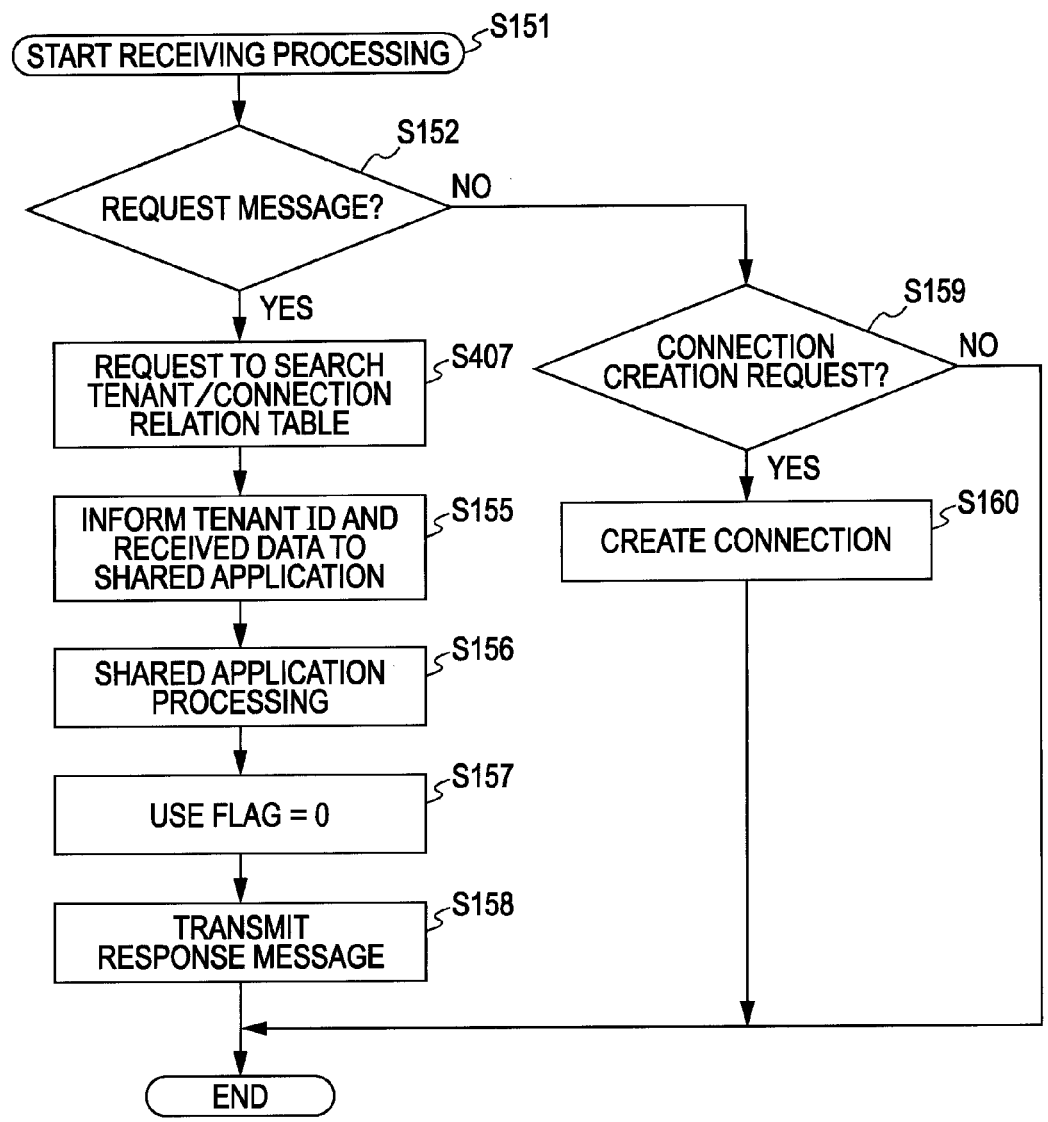
FIG. 23 is a flow chart of the processing by the shared server according to the fourth embodiment.

According to the fourth embodiment, since several tables which have been in the first to third embodiments are integrated into one, the processing of informing the relations between the tenants and the connections performed between the connection creating unit 3 and the connection creating unit 6 becomes unnecessary. Further, the update processing of the use flag may be performed only by the GW 103 where an event of a message transmission start and a reception completion happens (note a difference between the processing of N in S159 of FIG. 13 and the processing of N in S159 of FIG. 23).

As mentioned above, since the state of the connections may be managed at one place, this embodiment addresses a problem of losing correspondence among a plurality of tables at a failure.

The respective functions having been described in the above first to fourth embodiments may be provided in various combinations.

Figure 25:
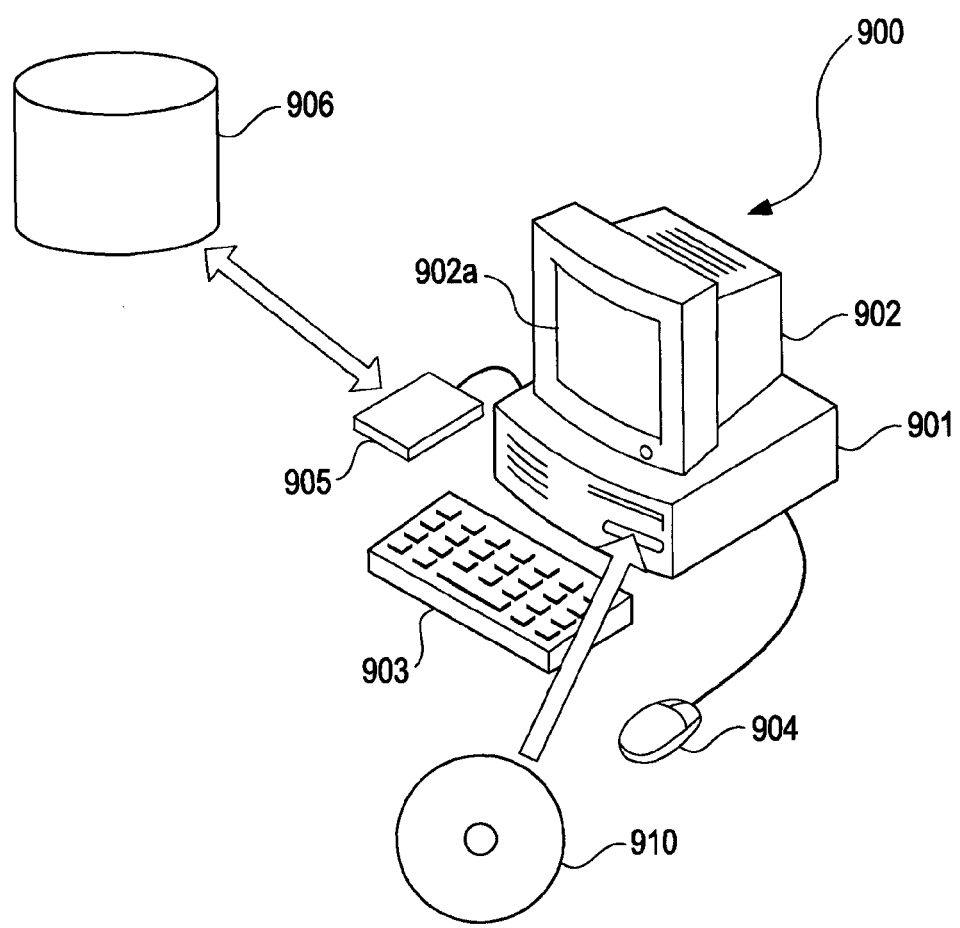
FIG. 25 illustrates one example of the hardware structure of the GW, the shared server, and the relation management server according to the embodiments.

The invention is applicable to a computer system as described below. FIG. 25 illustrates an example of the computer system to which the invention is applied. A computer system 900 illustrated in FIG. 25 includes a main body 901 with a CPU and a disk drive built therein, a display 902 for displaying images according to an instruction from the main body 901, a keyboard 903 for entering various information into the computer system 900, a mouse 904 for indicating positions on a display screen 902a of the display 902, and a communication unit 905 for gaining access to an external database and the like to download a program or so stored in another computer system. The communication unit 905 may be a network communication card or a modem.

As mentioned above, a program for executing the respective steps in the computer system forming the relaying device (GW 100 to 103) may be provided as a tenant management program. This program is stored in a computer-readable recording medium, hence to make the computer system of the relaying device execute the above steps. The program for executing the above respective steps is stored in a portable recording medium such as a disk 910, or downloaded through the communication unit 905 from the recording medium 906 of another computer system. Further, the tenant management program for providing the computer system 900 at least with a tenant management function is entered into the computer system 900 and compiled. This program makes the computer system 900 work as a tenant management system having the tenant management function. This program may be stored, for example, in a computer-readable recording medium such as the disk 910. Here, the recording medium readable by the computer system 900 includes an internal storage such as ROM and RAM built in a computer, a portable storage medium such as the disk 910, a flexible disk, a DVD disk, an optical magnetic disk, and an IC card, a database for holding a computer program, another computer system and its database, and various kinds of recording medium, accessible by a computer system, connected through a communication function such as the communication unit 905.

Figure 26:
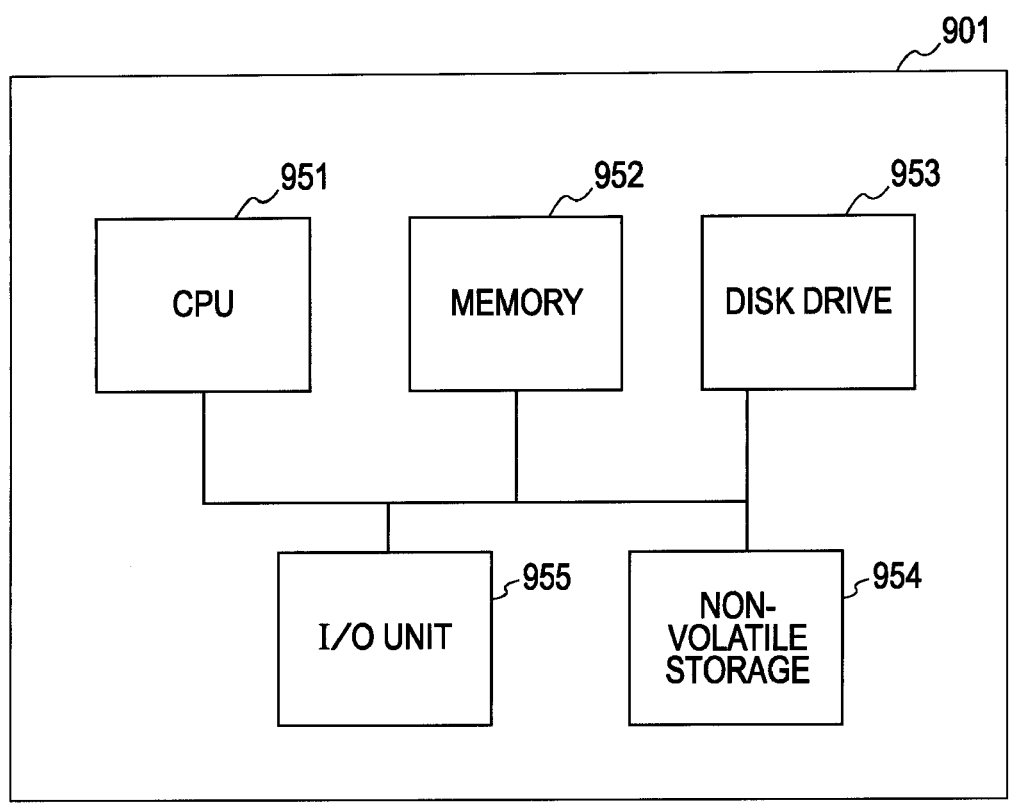
FIG. 26 illustrates one example of the hardware structure inside each of the GW, the shared server, and the relation management server, according to the embodiments.

Here, the hardware structure of each of the above mentioned GWs 100 to 103 will be described with reference to FIG. 26. The GWs 100 to 103 respectively include a CPU (Central Processing Unit) 951 that is an operation device, a memory 952 that is a main storage, a disk drive 953 which stores the disk 910 to read and write data, a non-volatile storage 954 that is a non-volatile storage, and further an I/O unit 955 which controls data communication with an external device. The respective functional blocks in each of the above-mentioned GWs 100 to 103 are realized in cooperation with the hardware resources including the CPU 951, the memory 952, the non-volatile storage 954, and the I/O unit 955 and the firmware previously stored in the non-volatile storage 954.

The GW and the shared server disclosed in the embodiments may save the processing of writing and reading the tenant IDs in all the packets and the messages, thereby improving the performance. The propagation of a connection and a tenant ID is the processing desired in every connection. Therefore, when a plurality of messages/packets is transmitted on one connection, the frequencies of the processing are more decreased than ever and the performance may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that various changes, substitutions, and alterations could be made hereto without departing from the spirit and scope of the invention.

What is claimed is:

1. A computer readable recording medium which stores a tenant management program for making a processor execute:
obtaining, upon receipt of a request message from a client, a tenant identifier by using an address of a client side of a relay unit which has received the request message as a search key to reference a storing unit which stores a first correspondence relation between information for specifying the address of the client side of the relay unit and the tenant identifier for identifying a tenant to which the client belongs, a second correspondence relation among first connection information concerning a first connection between the relay unit and a server, the tenant identifier, and usage information indicating a state of the connection, the state of the connection being any one of an unused state, a busy state, and an uncreated state, and a third correspondence relation between second connection information about a connection between the client and the relay unit, and the first connection information;
creating the first connection information when the second correspondence relation does not include the tenant identifier, and writing a correspondence relation of the created first connection information, the obtained tenant identifier, and usage information indicating a busy state, into the second correspondence relation;
creating the second connection information from the address of the client who transmitted the request message, and writing the created first connection information and the created second connection information into the third correspondence relation;
setting the connection between the relay unit and the server according to the created first connection information;
transmitting the obtained tenant identifier to the server;
transmitting the received request message to the server through the set connection; and
setting the usage information to an unused state upon receipt of a reply message to the received request message from the server.

2. The computer readable recording medium according to claim 1, which makes the relay unit execute:
upon receipt of a request message from a client different from the client, and when the tenant identifier is in the second correspondence relation and the usage information indicates an unused state, setting the usage information to the busy state, and writing the usage information indicating the busy state in the second correspondence relation;
creating the second connection information from the address of the client, and writing the created first connection information and the created second connection information into the third correspondence relation;
transmitting the received request message to the server through the connection; and
setting the usage information to the unused state upon receipt of the reply message to the received request message from the server.

3. The computer readable recording medium according to claim 1, wherein the tenant management program makes a processor execute:
upon receipt of a request message from a second client different from the client, and when a first entry including the usage information indicating the unused state, corresponding to the tenant identifier is not included in the second correspondence relation, and a second entry corresponding to a tenant identifier different from the obtained tenant identifier and including the usage information indicating the unused state is included in the second correspondence relation, setting the usage information of the second entry to a busy state, setting the obtained tenant identifier, and writing the usage information of the second entry indicating a busy state into the second correspondence relation;

creating the second connection information from the address of the second client and writing the created first connection information and the created second connection information into the third correspondence relation;

transmitting the tenant identifier obtained in the tenant identifier obtaining procedure to the server;

transmitting the request message received from the second client to the server through the connection; and setting the usage information to the unused state upon receipt of a reply message to the request message received from the second client, from the server.

4. The computer readable recording medium according to claim 1, wherein in the procedure of transmitting the obtained tenant identifier to the server, when usage information indicating an uncreated state is present, embedding the obtained tenant identifier into a request message and transmitting the request message to the server.

5. The computer readable recording medium according to claim 1, wherein the tenant management program makes a processor execute:

when the storing unit further stores a fourth correspondence relation between the tenant identifier and an upper limit of connections available to the tenant of the tenant identifier, searching the fourth correspondence relation using the tenant identifier of the tenant to which the client having transmitted the request message belongs as a search key, to obtain the upper limit of the connections; and performing error processing when the number of the connections used by the tenant to which the client having transmitted the request message belongs reaches the upper limit of the connections.

6. The tenant management program according to claim 1, wherein the storing unit is provided in a relation management server outside of the relay unit.

7. A relay unit comprising:

a storing unit which stores a first correspondence relation between information for specifying an address on a client side and a tenant identifier for identifying a tenant to which a client belongs, a second correspondence relation among first connection information concerning a connection with a server, the tenant identifier, and usage information indicating a state of the connection, the state of the connection being any one of an unused state, a busy state, and an uncreated state, and a third correspondence relation between second connection information concerned about a connection with the client and the first connection information;

a tenant identifying unit which, upon receipt of a request message from the client, reads the first correspondence relation, for use as a search key when searching for the address on the client side to obtain the tenant identifier;

a connection identifying unit which creates the first connection information when a tenant identifier is not obtained by the tenant identifying unit in the second correspondence relation and writes the correspondence relation among the created first connection information, the obtained tenant identifier, and the information indicating a busy state in the second correspondence relation, and creates the second connection information from the address of the client who transmitted the request message and writes the created first connection information and the created second connection information into the third correspondence relation; and a connection creating unit which creates the connection with the server, according to the created first connection information, and transmits the obtained tenant identifier and the received request message to the server through the created connection, wherein the connection identifying unit sets the usage information to an unused state upon receipt of a reply message to the received request message, from the server.

8. The relay unit according to claim 7, wherein upon receipt of a request message from a client different from the above client, when the tenant identifier obtained by the tenant identifying unit is in the second correspondence relation and the usage information indicates an unused state, the connection identifying unit sets the usage information to a busy state, writes the usage information into the second correspondence relation, creates the second connection information from the address of the client who transmitted the request message, and writes the created first connection information and the created second connection information into the third correspondence relation, and the connection creating unit transmits the received request message to the server through the connection.

9. The relay unit according to claim 7, wherein upon receipt of a request message from a second client different from the client, when a first entry including the usage information indicating the unused state and corresponding to the tenant identifier obtained by the tenant identifying unit is not in the second correspondence relation, and a second entry corresponding to a tenant identifier different from the obtained tenant identifier and including the usage information indicating the unused state is not in the second correspondence relation, the connection identifying unit sets the usage information of the second entry to a busy state, sets the obtained tenant identifier, writes the usage information into the second correspondence relation, creates the second connection information from the address of the second client, and writes the created first connection information and the created second connection information into the third correspondence relation, and the connection creating unit transmits the tenant identifier obtained by the tenant identifying unit to the server, and transmits the request message received from the second client to the server through the connection.

* * * * *